(12) United States Patent
Tomlinson et al.

(10) Patent No.: US 10,176,056 B2
(45) Date of Patent: Jan. 8, 2019

(54) SYSTEMS AND METHODS FOR QUORUM-BASED DATA RECOVERY

(71) Applicants: Martin Tomlinson, Totnes (GB); Cen Jung Tjhai, London (GB); Andersen Cheng, London (GB)

(72) Inventors: Martin Tomlinson, Totnes (GB); Cen Jung Tjhai, London (GB); Andersen Cheng, London (GB)

(73) Assignee: PQ SOLUTIONS LIMITED, London (GB)

( * ) Notice: Subject to any disclaimer, the term of this patent is extended or adjusted under 35 U.S.C. 154(b) by 442 days.

(21) Appl. No.: 14/683,379

(22) Filed: Apr. 10, 2015

(65) Prior Publication Data

US 2015/0378842 A1 Dec. 31, 2015

(30) Foreign Application Priority Data

Jun. 27, 2014 (GB) .................................. 1411532.3
Feb. 4, 2015 (GB) .................................. 1501874.0

(51) Int. Cl.
| H04L 9/00 | (2006.01) |
| G06F 11/14 | (2006.01) |
| G06F 21/40 | (2013.01) |
| H04L 9/14 | (2006.01) |
| H04L 9/08 | (2006.01) |
| H04L 9/28 | (2006.01) |

(52) U.S. Cl.
CPC .......... *G06F 11/1469* (2013.01); *G06F 21/40* (2013.01); *H04L 9/085* (2013.01); *H04L 9/14* (2013.01); *G06F 2201/84* (2013.01); *H04L 2209/24* (2013.01)

(58) Field of Classification Search
CPC .. G06F 11/1469; G06F 21/40; G06F 2201/84; H04L 2209/24; H04L 9/0888; H04L 9/14
USPC ................................................ 380/28; 714/20
See application file for complete search history.

(56) References Cited

U.S. PATENT DOCUMENTS 7,136,489 B1 * 11/2006 Madhusudhana ....... H04L 9/085
                                                                    380/277
9,367,697 B1 * 6/2016 Roth ..................... G06F 21/602
(Continued)

FOREIGN PATENT DOCUMENTS

EP           801478 A2    10/1997

OTHER PUBLICATIONS

Search Report dated Sep. 11, 2014 in corresponding GB Application No. 1411532.3.

*Primary Examiner* — Gary S Gracia
(74) *Attorney, Agent, or Firm* — Morris & Kamlay LLP

(57) ABSTRACT

The present disclosure includes systems and methods for quorum-based data recovery, in which data is recovered provided at least a minimum number of quorum data portions are presented. In exemplary embodiments, a predetermined minimum number of versions of original data is received, and the original data is reconstructed from the received versions, wherein the original data cannot be reconstructed without loss unless a predetermined minimum number of versions is received. In other embodiments, erroneous or corrupted quorum data portions are detected and associated participants presenting said erroneous or corrupted quorum data portions are identified.

23 Claims, 14 Drawing Sheets

(56) References Cited

U.S. PATENT DOCUMENTS

| | | | |
|---|---|---|---|
| 2002/0026345 A1* | 2/2002 | Juels | G06Q 30/02 705/80 |
| 2004/0047472 A1* | 3/2004 | Eskicioglu | H04L 9/085 380/277 |
| 2004/0091114 A1* | 5/2004 | Carter | G06F 21/606 380/259 |
| 2005/0114650 A1* | 5/2005 | Rockwood | H04L 63/08 713/155 |
| 2008/0263363 A1* | 10/2008 | Jueneman | G06F 21/32 713/184 |
| 2009/0116649 A1* | 5/2009 | Perlman | H04L 9/085 380/277 |
| 2009/0254750 A1* | 10/2009 | Bono | H04L 63/0428 713/170 |
| 2010/0037055 A1* | 2/2010 | Fazio | H04L 9/3255 713/171 |
| 2010/0325441 A1* | 12/2010 | Laurie | G06F 21/31 713/185 |
| 2012/0321086 A1* | 12/2012 | D'Souza | H04L 9/0825 380/278 |
| 2013/0039491 A1* | 2/2013 | Unagami | H04L 9/085 380/44 |
| 2013/0268931 A1* | 10/2013 | O'Hare | G06F 9/455 718/1 |
| 2013/0290708 A1* | 10/2013 | Diaz | H04L 41/28 713/165 |
| 2013/0291056 A1* | 10/2013 | Gaudet | H04W 12/06 726/1 |
| 2014/0201533 A1* | 7/2014 | Kruglick | H04L 63/062 713/171 |

\* cited by examiner

Secret Key, S :
(r=10)

| 8 | 2 | 6 | 4 | 9 | 9 | 1 | 7 | 7 | 1 | ~19

Error Distribution
Sequence, $D_e$ :
(n=5)

| 2 | 5 | 1 | 5 | 4 | 1 | 4 | 3 | 2 | 3 | ~21

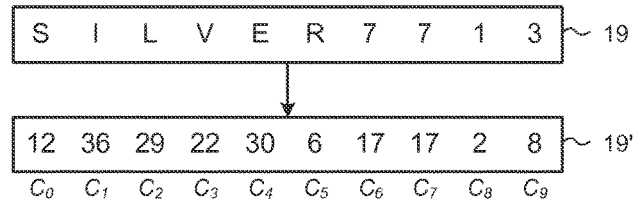
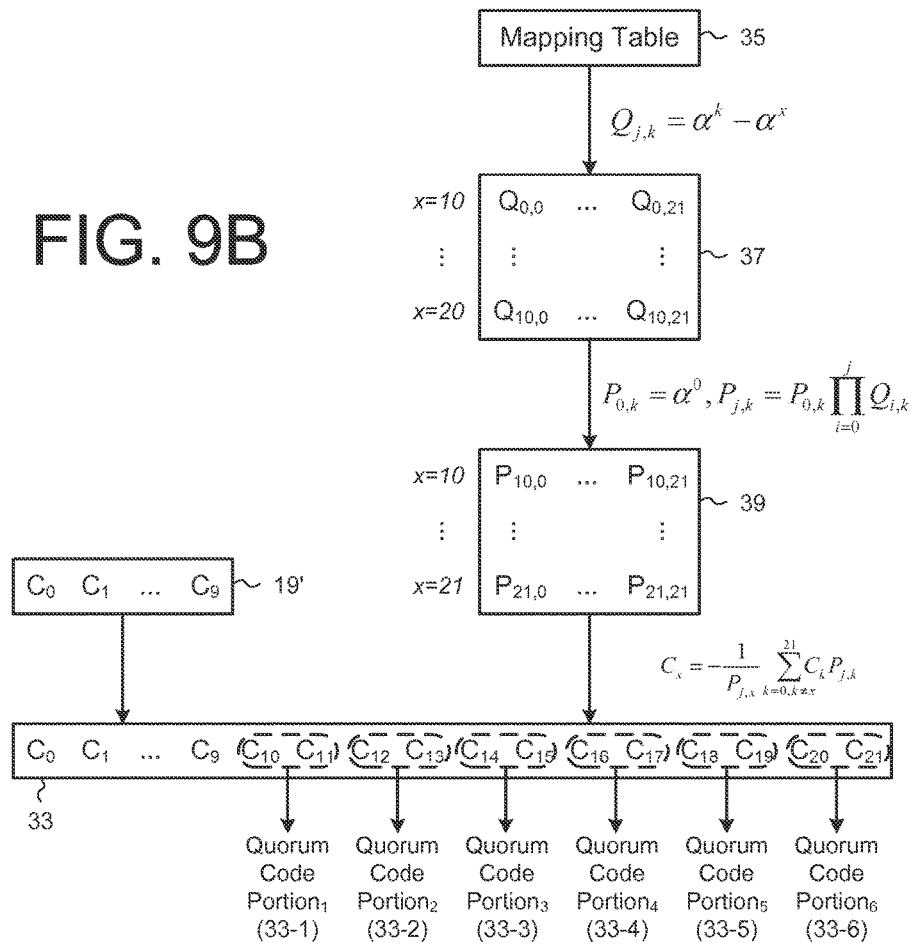
FIG. 9A
FIG. 9B

SYSTEMS AND METHODS FOR QUORUM-BASED DATA RECOVERY

FIELD OF THE INVENTION

This invention relates to data processing, and more particularly to systems and methods for quorum-based data recovery.

BACKGROUND OF THE INVENTION

Generally, a quorum is defined as the minimum number of members of an assembly or society that must be present at any of its meetings to make the proceedings of that meeting valid. There are many everyday applications where it is desirable that the authorisation power of any one individual is limited and that a number of individuals need to participate together to carry out an authorisation process. What is needed are systems and methods by which such a quorum-based principle is realised for data processing in a computing environment, such as encryption, authentication, data retrieval, access control, etc.

STATEMENTS OF THE INVENTION

Aspects of the present invention are set out in the accompanying claims.

According to one aspect, the present invention provides a method of quorum-based data recovery, comprising: receiving a predetermined minimum number of versions of original data, and reconstructing the original data from the received versions, wherein the original data cannot be reconstructed without loss unless a predetermined minimum number of versions is received.

A plurality of versions of said original data can be generated and distributed to a plurality of entities. Each generated version of original data may include a corrupted data value at a respective defined position in the original data, and wherein the original data values are determined by the majority data values at each respective defined position of the received versions. Alternatively, generating the versions may comprise: defining a series of relationships that encode dependencies between data values of the original data based on the predetermined minimum number of incomplete versions required to reconstruct the original data, and computing dependent data from the relationships, wherein at least a portion of said dependent data is distributed as a version of said original data each entity. The relationships may be equations that encode dependencies between data values of the original data, and the dependent data may be solutions to the series of equations.

According to another aspect, the present invention provides a computer-implemented method of quorum-based data recovery, comprising receiving at least a predetermined minimum number of quorum portions generated from original data, wherein each quorum portion comprises one or more data values each identifying a solution to a respective one of a series of equations that encode dependencies between data values of the original data, each equation associated with a single unknown dependent data value; and determining reconstructed data from the received plurality of quorum portions, using a series of reconstruction equations each associated with a single unknown value of the candidate data, wherein the reconstructed data includes data values corresponding to the original data and data values corresponding to the plurality of quorum portions generated from said original data.

The number of quorum portions received may be greater than the predefined minimum required to reconstruct the original data, and the method further comprising reconstructing candidate data from each combination of the minimum number of received plurality of quorum portions, using a series of reconstruction equations each associated with a single unknown value of the candidate data, determining at least one candidate combination of received portions that produces at least one discrepancy between a data value of the reconstructed candidate data and a corresponding expected value, and identifying at least one received quorum portion as containing incorrect data based on the determined at least one candidate combination of received portions. The expected value may be a repeated sequence of data values in the original data.

Each candidate data may comprises data identifying reconstructed original data and reconstructed auxiliary data, and wherein the at least one discrepancy is between a data value of the reconstructed auxiliary data and a corresponding expected value. The at least one discrepancy may be between a calculated hash or checksum of the reconstructed original data or of a corresponding quorum portion of the reconstructed auxiliary data, and the corresponding hash or checksum value in the reconstructed auxiliary data A received quorum portion may be identified as containing incorrect data by determining the or each common received portion in a plurality of candidate combinations of received portions.

According to another aspect, the present invention provides a system for controlling access to stored encrypted data, wherein the decryption key is reconstructed from a predetermined minimum number of quorum portions. The system can generate a plurality of quorum portions based on the decryption key, where the number of quorum portions generated can be determined based on the total number of participants and the quorum number of portions required to reconstruct the decryption key. The quorum portions can be distributed to the participants in determined proportions in order to control sets of participants required to provide respective quorum portions in order to reconstruct the decryption key.

According to another aspect, the present invention provides a system for reconstructing original data from a predetermined minimum number of quorum portions generated from the original data, wherein the system is configured to detect and identify corrupted values in one or more of the received quorum portions. The quorum portions can be generated based on a cryptographic encoding of the original data together with hash digests of partial encryption keys distributed between quorum participants, wherein the cryptographic encoding is based on combinations of said partial encryption keys. The quorum portions can include the associated partial encryption key, whereby the validity of a received quorum portion can be verified by comparing a hash digest of the received purported partial encryption key with the reconstructed hash digest of the actual partial encryption key.

According to yet another aspect, the present invention provides a method of quorum-based data recovery, comprising generating a plurality of quorum portions of original data, by defining a quorum code including data values associated with original data to be encoded, and a predefined number of dependent data values, determining each said dependent data value as a solution to a respective one of a series of equations that encode dependencies between data values of the original data, wherein each equation is associated with a single unknown dependent data value, and defining each quorum portion as one or more of said dependent data values, and distributing the plurality of quorum portions between a plurality of entities, whereby the original data is reconstructable from a predetermined minimum number of quorum portions using a series of reconstruction equations each associated with a single unknown value of the recovered quorum code.

The original data may be a data file or portion of a data file or stream, or may be a key for decrypting an encrypted data file or for accessing a secure unit, device or module. The data recovery process may be repeated for each of a plurality of portions of the data file or data stream.

Each generated version of original data may include a corrupted data value at a respective defined position in the original data with each value having an associated value and corrupted data values are identified by their associated values such that the original data values are determined by the identified correct data values at each respective defined position of the received quorum portions or versions.

Each generated version of original data may include a corrupted data value at a respective defined position in the original data with each value having an associated value generated by a cryptographic function of said value, and corrupted data values are identified by the particular cryptographic function used to generate their associated values wherein the original data values are determined by the identified correct data values at each respective defined position of the received quorum portions.

A deliberate or accidental falsified value may be detected by means of an incorrect associated value. A number of deliberate or accidental falsified values may be detected and the associated entities identified. Additionally, when a sufficient number of quorum portions are received, the original data can be reconstructed.

A set of intermediate equations may be computed, wherein the series of equations are defined by pointwise products of the intermediate equations to introduce a succession of zeros in positions of corresponding unknown variables.

In some embodiments, the computed solutions are symbols of a codeword from an error correcting code. The equations may be based on Galois Field elements or may be based on other elements such as complex numbers.

The distribution of quorum portions to the plurality of entities may be based on a predefined combination or permutation of the minimum number of quorum portions required to reconstruct the original data.

The original data may be reconstructed from the received quorum portions by defining a series of reconstruction relationships that encode dependencies between data values of the received quorum portions, and computing dependent data from the series of reconstruction relationships, wherein the dependent data corresponds to values of the reconstructed original data.

Each predetermined version of original data may be received from a corresponding computing device, together with additional data associated with the computing device, and the additional data may be provided as inputs to the series of equations to compute the solutions. The additional data may be associated with a current location and/or identity of the computing device and/or absolute or derived biometric data of a participant.

The reconstructed data may be an encryption or decryption key, an authentication key or a password. The generated quorum portions may be encrypted using a common key or using distinct keys. The reconstructed data may be decrypted to recover the original data.

According to yet another aspect, the present invention provides a computer-implemented method of quorum-based data recovery, comprising receiving at least a predetermined minimum number of quorum portions generated from original data, wherein each quorum portion comprises a respective partial encryption key, and at least one ciphertext portion generated by encrypting the original data using an associated encryption key formed from a defined combination of said partial encryption keys; and decrypting the received ciphertext portions using an associated decryption key formed from the defined combination of received partial encryption keys, to recover the original data.

The at least one ciphertext portion may be generated by encrypting data comprising the original data and a hash of each partial encryption key. The received ciphertext portions may be decrypted to recover the original data and hash of said partial encryption keys, and at least one received quorum portion may be identified as containing incorrect data based on discrepancy between the recovered hash of the respective partial encryption key and a computed hash of the received respective partial encryption key.

A plurality of ciphertext portions may be generated for each quorum portion, by encrypting data comprising the original data and a hash of each partial encryption key using an associated encryption key formed from defined combinations of partial encryption keys. Associated ciphertext portions may be identified and decrypted for each defined combination of received partial encryption keys, using the combination of received partial encryption keys.

The associated ciphertext portions may be identified based on stored masking data defining the combinations of received partial encryption keys. At least one modifier value, derived from said generated ciphertext portions, may be calculated and stored, wherein each received quorum portion includes one of said generated ciphertext portions, and the remaining ciphertext portions may be reconstructed ciphertext portions using the stored at least one modifier value.

A greater number of quorum portions than the predefined minimum required to reconstruct the original data may be received, wherein the reconstructed original data is recovered from a combination of received quorum portions that produces no discrepancies in any of the hash values of the partial encryption keys of said combination of received quorum portions.

Each quorum portion may include encoded control data that can be used to be indicate that the associated quorum portion contains correct or incorrect data values. Each quorum portion may be generated from data including said control data at respective defined positions in the original data, wherein corrupted data values may be identified from discrepancies with the control data in the reconstructed original data. The control data may be generated based on a cryptographic function of the data value of the associated quorum portion, wherein corrupted data values may be identified from discrepancies between the reconstructed control data and recomputed control data values based on the cryptographic function of data values from the reconstructed original data.

According to another aspect, the present invention provides a computer-implemented method of quorum-based data recovery, comprising generating a plurality of quorum portions from said original data, wherein each generated version of original data includes a corrupted data value at a respective defined position in the original data, and distributing the plurality of quorum portions to a plurality of entities, whereby the original data is reconstructable from the majority data value at each respective defined position of a predetermined minimum number of quorum portions.

The plurality of quorum portions may be generated from original data, and the plurality of quorum portions may be distributed between a plurality of entities. The entities may comprise one or more of: a computing device, an authentication token and a security dongle. Identified discrepancies in received quorum portions may be used to identify the associated entity presenting quorum portions containing corrupted or erroneous values. One or more of said entities may receive a greater proportion of said quorum portions.

The original data may be an encryption or decryption key, an authentication key or a password.

At least one quorum portion may includes metadata associated with validity of the quorum portion.

According to yet another aspect, the present invention provides a system for controlling access to data, wherein the data is encoded into a predefined number of quorum portions based at least upon a predefined number of participants and a predefined minimum number of said participants that are required to access the data, whereby the original data can be recovered from any combination of said minimum number of quorum portions.

In further aspects, the present invention provides a system comprising at least one processor configured to perform any one of the above methods. In yet other aspects, there is provided a computer program arranged to carry out the above methods when executed by a programmable device.

BRIEF DESCRIPTION OF THE DRAWINGS

There now follows, by way of example only, a detailed description of embodiments of the present invention, with references to the figures identified below.

FIG. 2 is a flow diagram of quorum key generation process according to the first embodiment of the invention.

FIG. 3 and FIG. 4, which comprises

FIG. 6, which comprises

FIG. 9, which comprises FIGS. 9A and 9B, is a schematic block diagram of a worked example of generating quorum codes according to the second embodiment.

DETAILED DESCRIPTION OF EMBODIMENTS OF THE INVENTION

First Embodiment

A first embodiment of the invention will now be described for an example method of implementing quorum-based data processing within a secured computing environment, where recovery of sensitive data, such as a secret key, is only possible when a predefined minimum number of associated quorum keys are received from a corresponding quorum of available authorised participants. It will be appreciated that the embodiments described herein are applicable to many types and forms of secured computing environments and data processes carried out therein. As one example, the secured computing environment may facilitate secured access to encrypted data by a quorum of authorised personnel, such as selected directors and/or employees of a corporate entity, by reconstructing a decryption key based on quorum data received from a quorum of authorised personnel. As another example, the secured computing environment may facilitate controlled access to the original secure data file, by reconstructing the original secret data based on quorum data received from a quorum of authorised personnel. As yet another example, the secured computing environment may facilitate secured access by a quorum of authenticated personnel to a product or service (e.g. a bank account, a secure web site), and/or a facility (e.g. via an electronic lock of a physical building, lab, vault, safe deposit box, critical infrastructure system, etc.). In such an example, the secret key would be used for authentication instead of decryption, where by coming together and providing the predetermined minimum number of quorum keys, the quorum participants can be authenticated to be allowed access to the secured assets.

Figure 1:
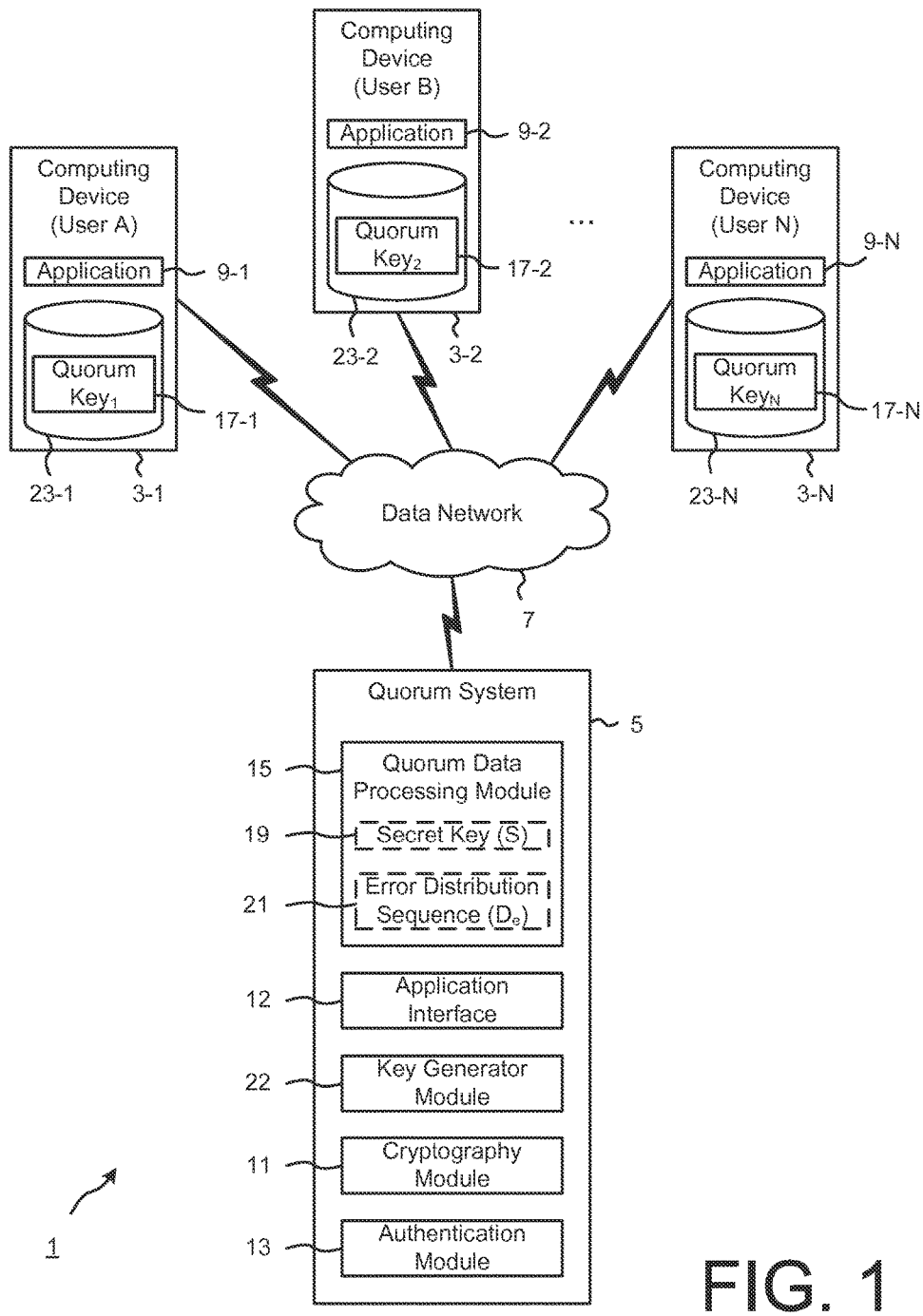
FIG. 1 is a block diagram showing the main components of a data communication system according to a first embodiment of the invention.

Referring to FIG. 1, a quorum data recovery system 1 in this exemplary embodiment comprises a plurality of computing devices 3-1 to 3-N, each computing device 3 in communication with a quorum system 5 via a data network 7. The computing devices 3 are associated with respective users (1 to N), who are individuals or entities authorised to participate as quorum members within the secured computing environment. The computing devices 3 execute respective software applications (or modules) 9 that communicate data with various processing modules via a corresponding application interface 12 of the quorum system 5. In particular, the quorum system 5 includes a quorum data processing module 15 configured to generate a set of quorum keys 17-1 to 17-N from a secret key (S) 19, based on a predetermined minimum number (M) of the total number of authorised users (N) and an associated error distribution sequence ($D_e$) 21, as will be described below. The quorum system 5 can include a key generator module 22 for generating the secret key 19.

The quorum keys 17-1 to 17-N are transmitted to the respective computing devices 3-1 to 3-N for storage in a respective memory 23. The quorum data processing module 15 is also configured to receive a plurality of quorum keys 17 from respective computing devices 3, for example in response to a request for data from available quorum participants, and to recover the original secret key 19 from the received quorum keys 17, as will be described below. In this way, the system 1 inherently requires and verifies the presence of a predetermined minimum number of users for quorum-based recovery of the original data, e.g. the secret key 19.

The quorum system 5 can also include a cryptography module 11 for encrypting data based on the secret key 19 and for decrypting data based on the recovered secret key 19, and an authentication module 13 for verifying the recovered secret key 19 and authorising access to another data processing module or entity (not shown). Advantageously, the quorum system 5 does not need to store a permanent copy of the secret key 19 nor the error distribution sequence 21 (which are illustrated with dashed lines in FIG. 1) once the quorum keys 17 have been generated and provided to the respective computing devices 3, thereby providing additional security against malicious intrusion into the system 1. Similarly, re-constructed keys may be recovered on a per-session basis and deleted from memory after the key has been used for the associated data process.

The computing devices 3 may be of a type that is known per se, such as a desktop computer, laptop computer, a tablet computer, a smartphone such as an iOS™, Blackberry™ or Android™ based smartphone, a 'feature' phone, a personal digital assistant (PDA), or any processor-powered device with suitable input and display means. The data network 7 may comprise a terrestrial cellular network such as a 2G, 3G or 4G network, a private or public wireless network such as a WiFi™-based network and/or a mobile satellite network or the Internet.

Figures 2, 3:
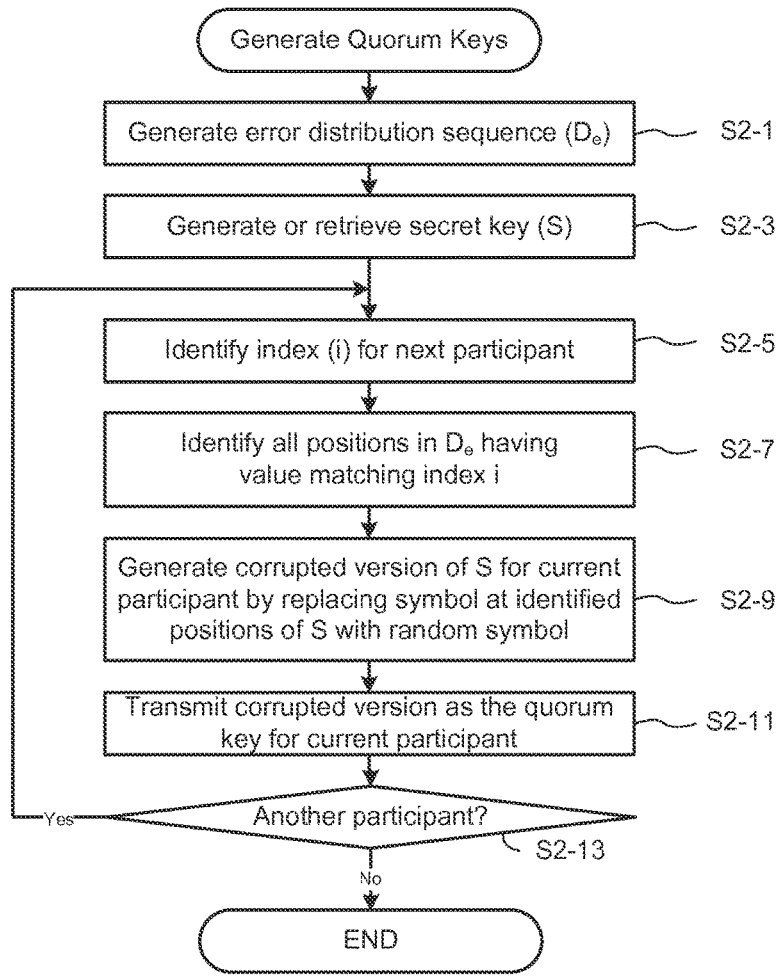

A brief description has been given above of the components forming part of the quorum data recovery system 1 of this embodiment. A more detailed description of the operation of these components in this embodiment will now be given with reference to the flow diagram of FIG. 2, for an example computer-implemented process of generating the set of quorum keys 17. Reference is also made to FIGS. 3 and 4, which are schematic illustrations of a worked example of generating the quorum keys.

Generally, information denoted as plaintext may be encrypted using symmetric key encryption where a secret key known only to the sender and the recipient is used to encrypt the plaintext into ciphertext. It will be appreciated that in the present embodiment, the quorum system 5 may be the sender and/or recipient in this scenario, whereby the secret key 19 is recovered based on quorum keys 17 received from a quorum of authorised users. Alternatively, the quorum system 5 may be an intermediary entity between the sender and receiver, facilitating recovery of the secret key 19 based on quorum keys 17 received from a quorum of authorised users.

There are many standard methods of symmetric or asymmetric key-based encryption. One example is the Advanced Encryption Standard (AES), as defined in Federal Information Processing Standards Publication 197, United States National Institute of Standards and Technology (NIST), Nov. 26, 2001. AES is an example of symmetric encryption system where there is a secret key 19 that is used to encrypt the plaintext into ciphertext and the same key is used to decrypt the ciphertext back to the plaintext. As another example, an asymmetric encryption technique can be used, where the encryption key cannot be used for decryption. A different key, typically a private key is the secret key 19 which is used for decryption. RSA is such an example, as discussed in "A Method for Obtaining Digital Signatures and Public-Key Cryptosystems", R. Rivest. A. Shamir and L. Adleman Communications of the ACM 21 (2): 120-126, 1978.

The secret key 19 in general may be represented by a sequence of symbols, such as a sequence of numbers of any defined radix. It is appreciated that any symbol alphabet may be used, such as binary numbers, alphanumeric characters having a predefined mapping to a set of respective numerical values, etc.

As shown in FIG. 2, at step S2-1, the quorum data processing module 15 generates a secret key 19, or retrieves the secret key 19 from another module or entity, for example a secure memory or a key generator module 22. FIG. 3 illustrates an example of a secret key 19 using a radix r=10:

$$S = 8264991771$$

As mentioned above, the quorum data processing module 15 processes the secret key 19 in order to generate and distribute versions of the secret key 19 (the quorum keys 17) to N participants so that at least M participants need to cooperate, by providing their respective quorum key 17, in order to recover the secret key 19. In this embodiment, the quorum keys 17 are corrupted versions of the secret key 19 that are given to each participant. In the worked example of the present embodiment, the predetermined minimum number (M) of quorum participants is three and the total number (N) of authorised participants is five. Each digit of the secret key 19 is distributed so that the digit is error free to N−1 participants and is in error for one participant. The errors are distributed so that each participant has the same number of errors. It is appreciated that any minimum number (M) of quorum participants and any total number (N) of authorised participants may be used, provided the secret key 19 may be derived error free, for example using majority voting, and provided no number of participants less than M can derive the secret key 19, error free, no matter which subset of participants are involved.

Accordingly, at step S2-3, the quorum data processing module 15 generates an error distribution sequence ($D_e$) 21 defining which participant has the error for the corresponding digit position of the secret key 19. The error distribution sequence 21 is generated pseudo-randomly and kept secret from the participants. For example, the error distribution sequence 21 can be generated as a string of randomly distributed numbers from 1 to N, where each number from 1 to N appears the same number times to form a string having length equal to the length of the secret key 19. FIG. 4 illustrates an example of a generated error distribution sequence 21, where each number from 1 to N=5 appears exactly twice for r=10:

$$D_e = 2515414323$$

The quorum data processing module 15 then proceeds to generate a quorum key 17 for each of the N authorised users of system 1. At step S2-5, the quorum data processing module 15 identifies an index value (i) for the next participant in the set of authorised users of the system 1, the index values (i) corresponding to the randomly distributed numbers 1 to N of the error distribution sequence 21. As this is the first quorum key 17 to be generated, the index value i=1 is identified for the first participant. At step S2-7, the quorum data processing module 15 identifies all positions in the error distribution sequence 21 having a value matching the current index value. Referring to the example illustrated in FIG. 4A, the third and sixth positions of the error distribution sequence ($D_e$) 21 are identified as having values matching the current index value i=1.

At step S2-9, the quorum data processing module 15 generates a corrupted version of the secret key 19 for the current participant. In this embodiment, the corrupted version is generated by replacing the symbol at each position of the secret key 19 corresponding to the positions in the error distribution sequence 21 identified at step S2-7, with a pseudo-randomly selected symbol that is different to the correct symbol in the original secret key 21. Referring again to the example in FIG. 4A, the symbols "6" and "9" in the third and sixth positions of the secret key (S) 21 are substituted with pseudo-randomly selected error symbols "3" and "8" to form a first quorum key 17-1:

Quorum Key$_1$=8234981771

At step S2-11, the corrupted version of the secret key 21 is transmitted by the quorum data processing module 15 to the computing device 3-1 of the first user, for storage in memory 23-1 as the quorum key 17-1 for that participant. At step S2-13, the quorum data processing module 15 determines whether another quorum key 17 is to be generated for a next participant, and if so, processing returns to step S2-5 until all quorum keys 17 have been generated for the set of N participants in the system 1. Preferably, the quorum data processing module 15 can delete the secret key 19 and the error distribution sequence 21 from working memory after all of the quorum keys 17 have been transmitted to the respective computing devices 3.

Figure 4A:
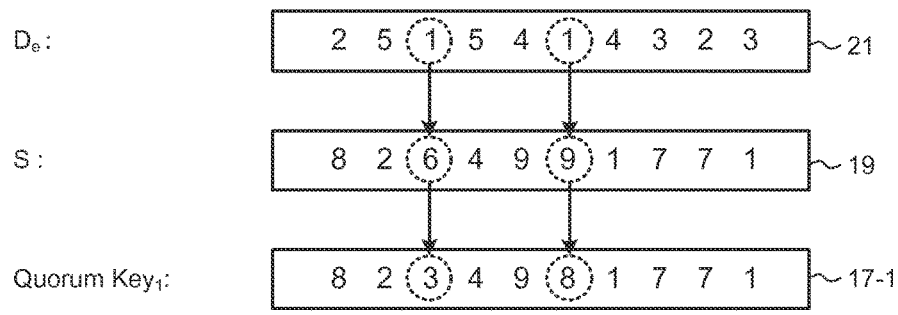
FIGS. 4A to 4E, are schematic block diagrams of a worked example of generating quorum keys according to the first embodiment.
Figure 4B:
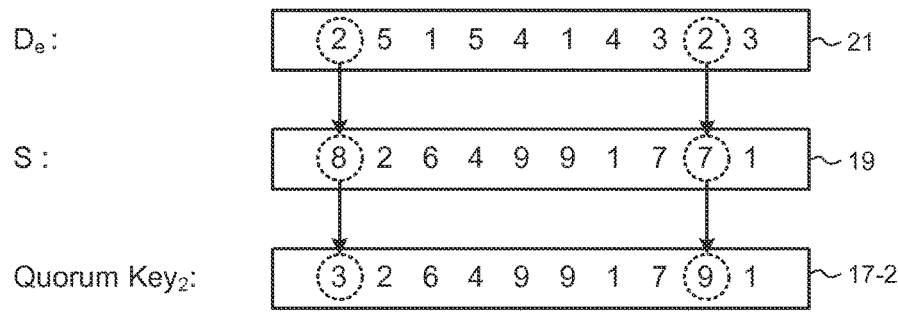

FIGS. 4B to 4E schematically illustrate generation of the second to fifth quorum keys 17-2 to 17-5 for the second to fifth participants in the present worked example. As shown in FIG. 4B, the symbols "8" and "7" in the first and ninth positions of the secret key (S) 21, identified by the value "2" in the corresponding positions of the error distribution sequence ($D_e$) 21, are substituted with pseudo-randomly selected error symbols "3" and "9" to form a second quorum key 17-2:

Quorum Key?=3264991791

Figure 4C:
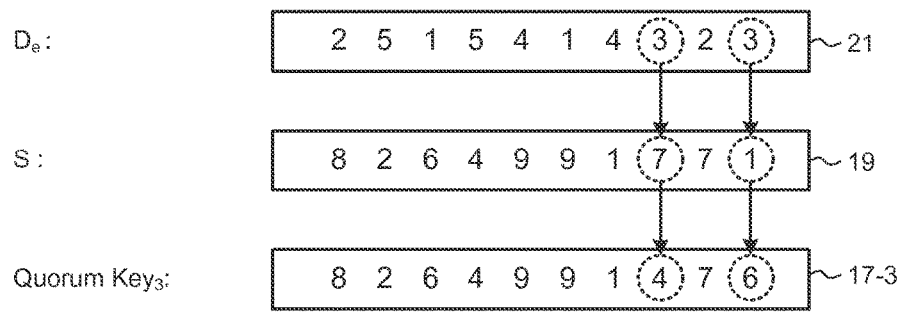

As shown in FIG. 4C, the symbols "7" and "1" in the eighth and tenth positions of the secret key (S) 21, identified by the value "3" in the corresponding positions of the error distribution sequence ($D_e$) 21, are substituted with pseudo-randomly selected error symbols "4" and "6" to form a third quorum key 17-2:

Quorum Key$_3$=8264991476

Figure 4D:
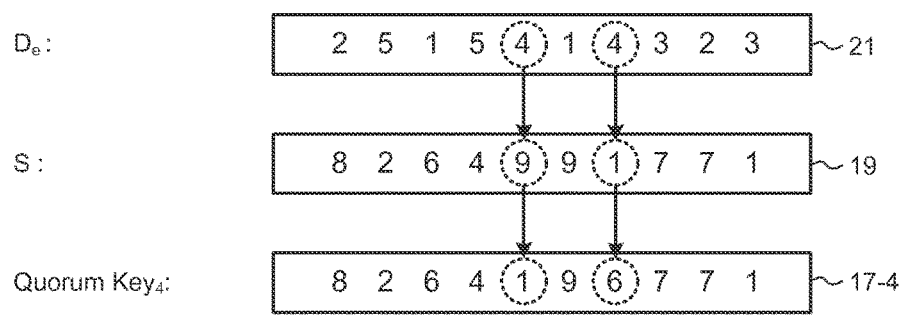

As shown in FIG. 4D, the symbols "9" and "1" in the fifth and seventh positions of the secret key (S) 21, identified by the value "4" in the corresponding positions of the error distribution sequence ($D_e$) 21, are substituted with pseudo-randomly selected error symbols "1" and "6" to form a fourth quorum key 17-2:

Quorum Key$_4$=8264196771

Figure 4E:
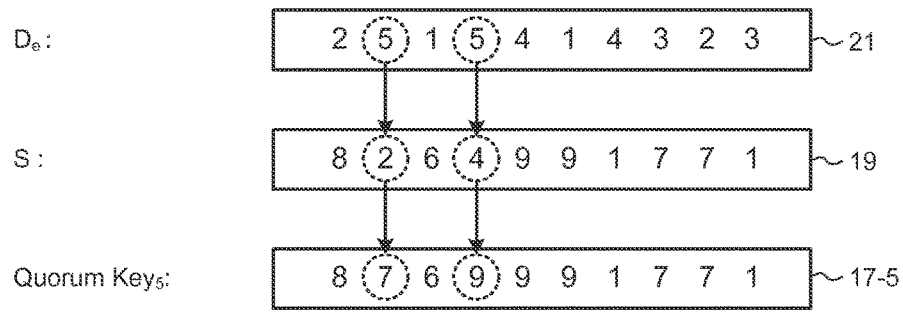

As shown in FIG. 4E, the symbols "2" and "4" in the second and fourth positions of the secret key (S) 21, identified by the value "5" in the corresponding positions of the error distribution sequence ($D_e$) 21, are substituted with pseudo-randomly selected error symbols "7" and "9" to form a fifth quorum key 17-5:

Quorum Key$_5$=8769991771

Figure 5:
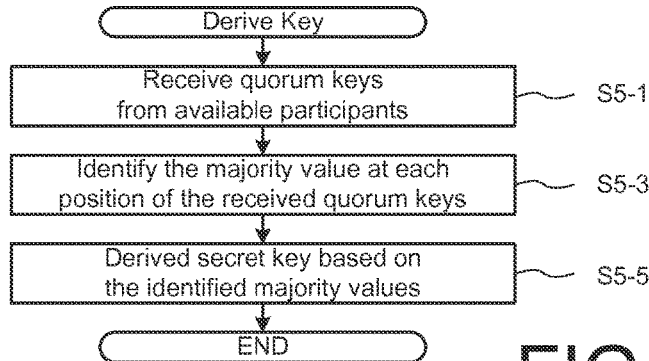
FIG. 5 is a flow diagram of a process for deriving a quorum key according to the first embodiment of the invention.
Figure 6A:
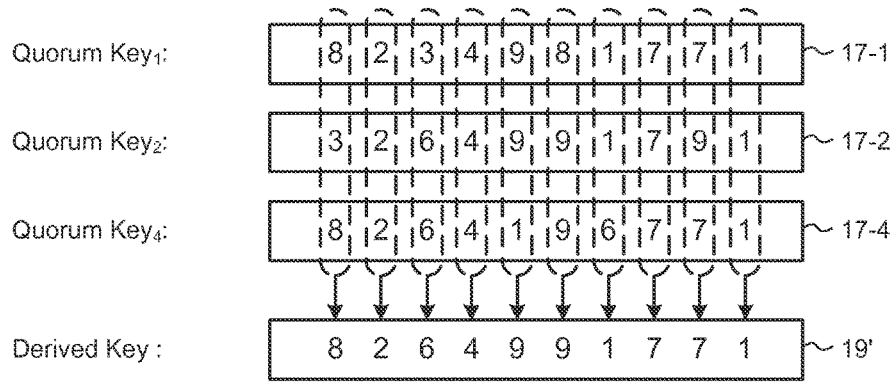
FIGS. 6A and 6B, is a schematic block diagram of a worked example of deriving a quorum key according to the first embodiment.
Figure 6B:
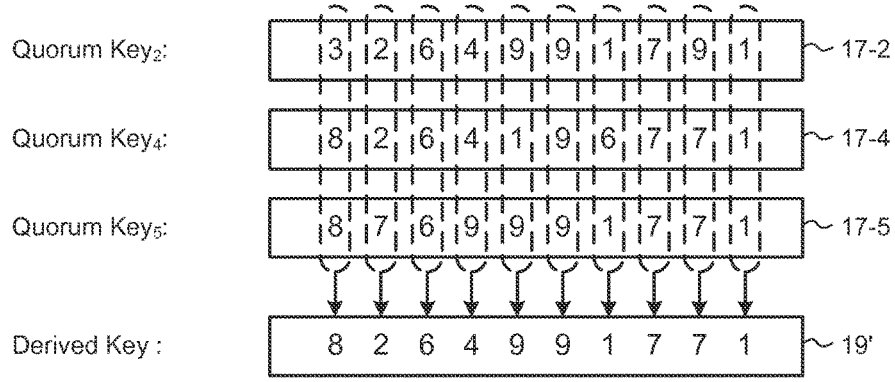

FIG. 5 is a flow diagram for an example computer-implemented process of deriving the original secret key 19 from a received plurality of quorum keys 17, according to the present embodiment. Reference is also made to FIGS. 6A and 6B, which are schematic illustrations of the worked example continued from FIGS. 3 and 4. In the present embodiment, any three of the participants may come together to derive the secret key 19 by carrying out a majority vote for the digits in each digit position of the respective quorum keys 17 because there is no more than one difference in each position no matter which three participants are present to provide their respective quorum key 17.

As shown in FIG. 5, at step S5-1, the quorum data processing module 15 receives quorum keys 17 from the respective computing devices 3 of available participants. The applications 9 of the computing devices 3 can be configured to retrieve the stored quorum keys 17 from the memory 23 and communicate the quorum keys to the quorum data processing module 15 via the application interface 7 of the quorum system 5, for example in response to a request from the quorum data processing module 15. FIG. 6A shows one example of three quorum keys 17 received from respective participants 1, 2 and 4 of an exemplary quorum of autheorised users:

Quorum Key$_1$=8234981771

Quorum Key$_2$=3264991791

Quorum Key$_4$=8264196771

FIG. 6B shows another example of three quorum keys 17 received from respective participants 2, 4 and 5 of another exemplary quorum of authorised users:

Quorum Key$_2$=3264991791

Quorum Key$_4$=8264196771

Quorum Key$_5$=8769991771

At step S5-3, the quorum data processing module 15 identifies the majority symbol at each position of the received quorum keys 17, that is the symbol with the greatest number of occurrences at a particular position across all of the received quorum keys 17. As discussed above, the set of quorum keys 17 includes a single error at each position randomly distributed in the sequence of symbols. The original key can be derived when the minimum number of quorum participants have provided a corresponding quorum key 17 because at most, only one of the M received symbols at each position will be different. Accordingly, at step S5-5, the quorum data processing module 15 determines a derived secret key 19' based on the identified majority values from each position of the received quorum keys 17. Referring again to the example of FIG. 6A, for the first digit position there are two occurrences of the symbol "8" and one occurrence of the symbol "3". The majority vote is "8" for the first position of the derived key 19'. For the second digit position, there are three occurrences of "2", so the second digit for the derived key 19' is determined to be "2". For the third digit position, there are two occurrences of "6" and one of "3", so the third digit is determined to be "6". The remaining digit positions are processed in the same way until the secret key 8264991771 is derived. As illustrated in FIG. 6B, the same derived key 19' is obtained by the quorum data processing module 15 for a different set of M=3 quorum keys 17 received from participants 2, 4 and 5.

As an alternative, the minimum number (M) of quorum participants can be increased to four or more. For example, the quorum data processing module 15 can be adapted to search for error-corrupted sequences for M>3 based on the above principles. Alternatively, weights can be assigned by the quorum data processing module 15 for each participant for each digit position. For example, with a minimum of four participants from a total of six participants, it is sufficient that three participants have the correct value if these participants have weight 1 and the other participants have weight 0, for each digit position. The chosen three participants will be cycled to a different three participants for each digit position. For example, labelling participants as A, B, C, D, E, F. The twenty combinations of three participants with weight 1 are:

ABC ABD ABE ABF ACD ACE ACF ADE ADF AEF
BCD BCE BCF BDE BDF BEF CDE CDF CEF DEF

With this order, participant A is assigned the correct digit for positions 1 to 10 and incorrect digits for positions 11 to 20. Participant B is assigned the correct digit for positions 1 to 4 and 11 to 16 with incorrect digits assigned for the other positions. The other participants are assigned correct digits accordingly in similar manner. Correspondingly, for example participant A has weight 1 for digit positions 1 to 10 and weight 0 for digit positions 11 to 20.

In practice, the distributed quorum codes 17 with incorrect/corrupted symbols will be at least 20 symbols long, and between 30-50 symbols long for the worked example where M=3 for greater security. In the particular exemplary case of M=4, the codes may be several hundred symbols long because there is only one error in every 20 symbols for a group of three participants. A random permutation sequence could be applied to the order in which the participants have correct digits to prevent guesswork by an attacker. Additionally, measures can be implemented that discourage participants from guessing uncertain digits because two participants together know the uncertain digit positions, for example locking out participants and associated applications when the system detects that a user is inputting one or more guesses, and possibly followed by issuance of disciplinary proceedings, fines, etc.

Second Embodiment

Figure 7:
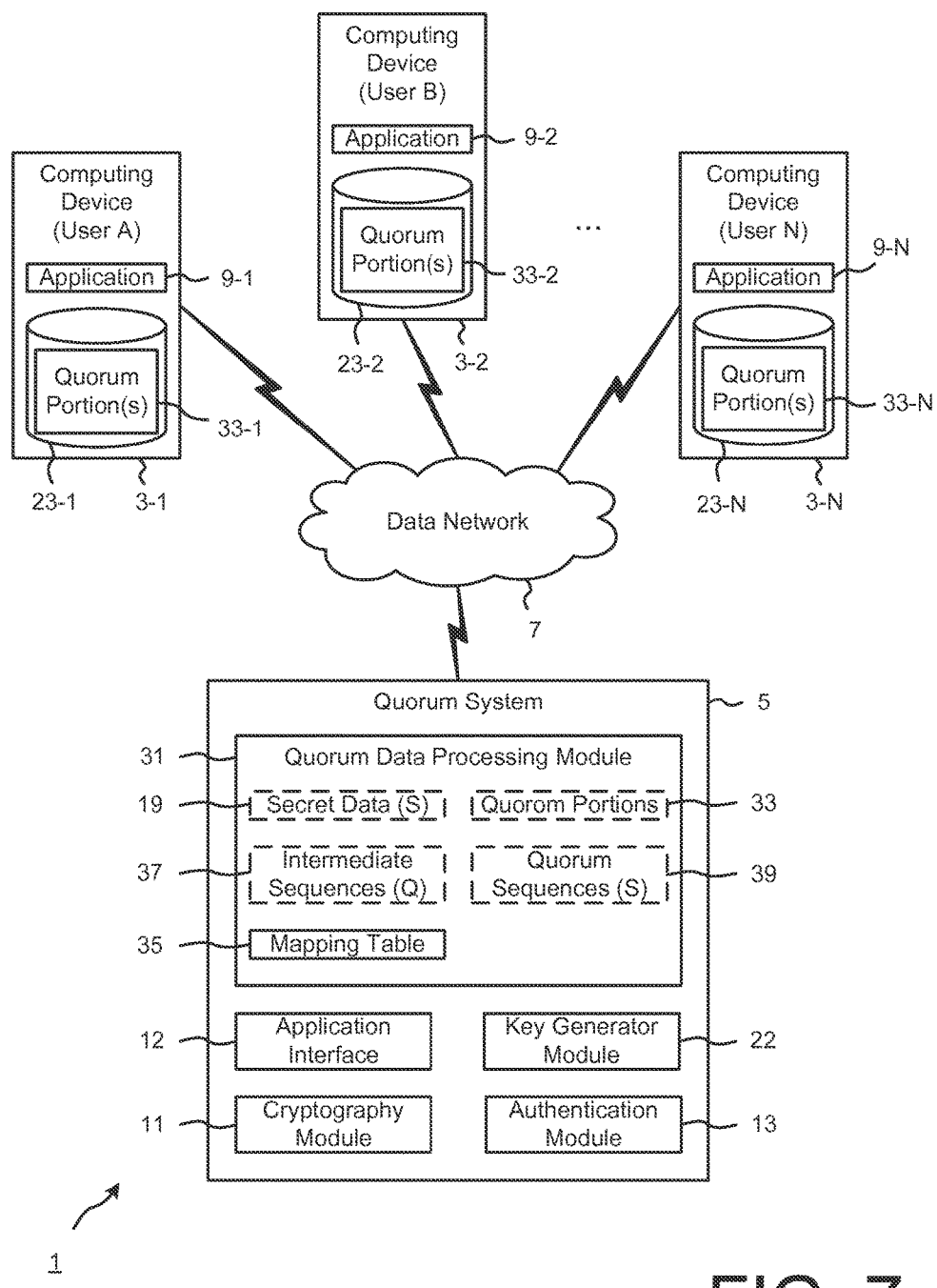
FIG. 7 is a block diagram showing the main components of a data communication system according to a second embodiment of the invention.

A second embodiment of the invention will now be described with reference to FIG. 7, using corresponding reference numerals to those of preceding figures where appropriate for corresponding elements. As shown in FIG. 7, the quorum data recovery system 1 also comprises a plurality of computing devices 3-1 to 3-N, each computing device 3 in communication with a quorum system 5 via a data network 7. In this embodiment, the quorum system 5 includes a quorum data processing module 31 for generating a quorum code 33 from the secret key (S) 19, based on a predetermined minimum number (M) of the total number of authorised users (N) and a symbol mapping table 35, from which a plurality of quorum code portions 33-1 to 33-N are determined for distribution to respective computing devices 3-1 to 3-N, as will be described in more detail below.

In this exemplary embodiment, the mapping table 35 is a look-up table that establishes a mapping between a predetermined symbol alphabet, such as letters and numbers, and corresponding Galois Field symbols. As is known in the art, a Galois Field may be generated from any prime number or power of a prime. In a worked example for the present embodiment, the prime number 37 is used to generate a Galois Field with 37 elements, which is large enough to accommodate the 26 letters of the alphabet as well as the numbers 0 to 9. All the field elements, except zero, may be generated from successive powers of a primitive root ($\alpha^n$) modulo P, where P is the predefined prime number.

Table 1 below is an example of the mapping table 35 for the present worked example, where the primitive root for P=37 is $\alpha$=2. The mapping table 35 lists all GF(37) elements (i.e. all powers of 2 mod 37) with the mappings to corresponding letters and numbers of the predefined character set (e.g. letters A to Z and numbers 0 to 9). The zero element, 0, is arbitrarily mapped to %.

TABLE 1

Example mapping table for GF(37) elements

| $\alpha^n$ | $\alpha^n$ mod 37 | Character |
|---|---|---|
| $2^0$ | 1 | 0 |
| $2^1$ | 2 | 1 |
| $2^2$ | 4 | 2 |
| $2^3$ | 8 | 3 |
| $2^4$ | 16 | 4 |
| $2^5$ | 32 | 5 |
| $2^6$ | 27 | 6 |
| $2^7$ | 17 | 7 |
| $2^8$ | 34 | 8 |
| $2^9$ | 31 | 9 |
| $2^{10}$ | 25 | A |
| $2^{11}$ | 13 | B |
| $2^{12}$ | 26 | C |
| $2^{13}$ | 15 | D |
| $2^{14}$ | 30 | E |
| $2^{15}$ | 23 | F |
| $2^{16}$ | 9 | G |
| $2^{17}$ | 18 | H |
| | 0 | % |
| $2^{18}$ | 36 | I |
| $2^{19}$ | 35 | J |
| $2^{20}$ | 33 | K |
| $2^{21}$ | 29 | L |
| $2^{22}$ | 21 | M |
| $2^{23}$ | 5 | N |
| $2^{24}$ | 10 | O |
| $2^{25}$ | 20 | P |
| $2^{26}$ | 3 | Q |
| $2^{27}$ | 6 | R |
| $2^{28}$ | 12 | S |
| $2^{29}$ | 24 | T |
| $2^{30}$ | 11 | U |
| $2^{31}$ | 22 | V |
| $2^{32}$ | 7 | W |
| $2^{33}$ | 14 | X |
| $2^{34}$ | 28 | Y |
| $2^{35}$ | 19 | Z |

From Table 1, for example, $2^{16}$ mod 37-9 and represents the letter G. All numbers 1 to 36 are different powers of 2. The only exception is 0 which is mapped to %. The GF(37) field elements obey the rules of addition and multiplication, in base 37. For example, $2^{11}+2^{14}=13+30$ mod $37=6=2^{27}$, and $2^{11} \times 2^{14}=13 \times 30$ mod $37=20=2^{25}$.

It will be appreciated that Galois Fields may be generated of any size, for passwords or encryption keys using any alphabet size. In practice, a larger symbol alphabet, such as ANSI, ASCII or Unicode characters sets, would be used. For encryption keys or passwords defined using these example character sets, the indices can be defined by 8 bits, for example using a Galois Field with $2^8=256$ elements, generated by a primitive polynomial with binary coefficients. An example is $1+x+x^2+x^7+x^8$ and the primitive root a, satisfies:

$$\alpha^8 = 1 + +\alpha^2 + ^7,$$

enabling the generation of $\alpha^0$ to $\alpha^{254}$ distinct field elements, and the construction of a mapping table 35 similar to Table 1 above, but with an alphabet size of 256 characters.

The generated quorum code portions 33-1 to 33-N are transmitted to the respective computing devices 3-1 to 3-N for storage in a respective memory 23. The quorum data processing module 31 is also configured to receive a plurality of quorum code portions 33-N from respective computing devices 3, for example in response to a request for data from available quorum participants, and to recover the original secret key 19 from the received quorum code portions 33-N by generating solutions to equations, as will be described below. In general, for a Galois Field of size N, and information consisting of a sequence of K characters, the total number of constructed equations or solutions S must be equal or greater than K subject to the constraint that S+K≤N. The quorum of participants must possess at least K solutions in order to reconstruct the information sequence of K characters.

Figure 8:
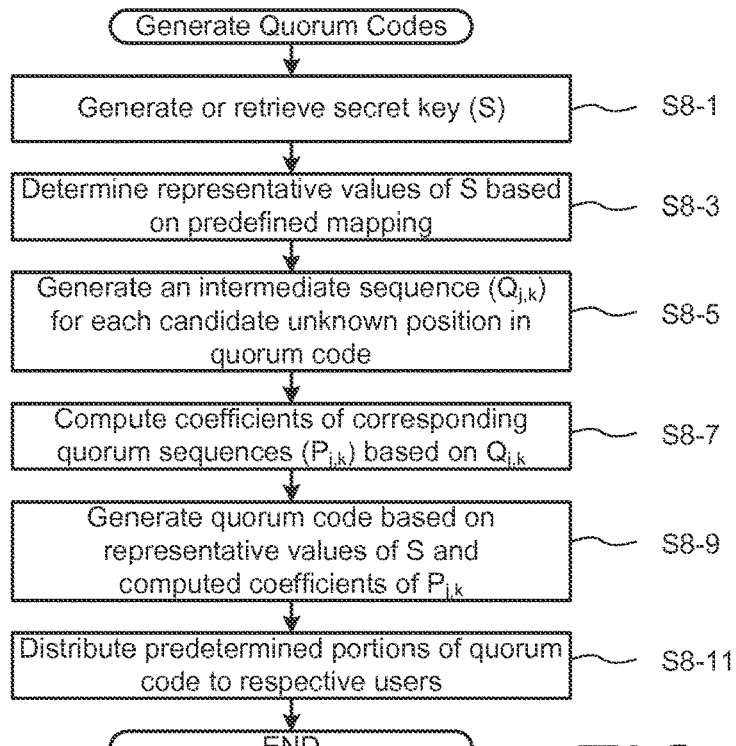
FIG. 8 is a flow diagram of a process for generating quorum codes according to the second embodiment of the invention.

A more detailed description of the operation of these components in this embodiment will now be given with reference to the flow diagram of FIG. 8, for an example computer-implemented process of generating the quorum codes 33 and portions 33-1 to 33-N. Reference is also made to FIGS. 9A and 9B which are schematic illustrations of a worked example according to the present embodiment. As shown in FIG. 8, at step S8-1, the quorum data processing module 31 generates a secret key 19, or retrieves the secret key 19 from another module or entity, for example a secure memory or a key generator module 22. FIG. 9A shows an example of a secret key 19 for a worked example according to the present embodiment. In this example, the secret key 19 is an alphanumeric password "SILVER7713" based on the character set of the mapping table 35, from which quorum code portions 33-1 to 33-N are to be generated and distributed to six authorised users (N=6), where at least five of them are needed to participate to reconstruct the secret key 19 (the predetermined minimum number of authorised users for q quorum, M=5).

At step S8-3, the quorum data processing module 31 determines a sequence of representative values 19' for corresponding symbols of the secret key 19, based on the mapping table 35. In the example of FIG. 9A, the password "SILVER7713" is represented as a sequence 19' of ten GF(37) field element ($\alpha^n$ mod 37) values, based on the mappings set out in Table 1 above:

12 36 29 22 30 6 17 17 2 8

As shown in FIG. 9B, the generated quorum code 33 in this example includes twenty-two elements or values: the ten representative values 19' of the secret key 19, followed by a sequence of twelve numerical solutions that are computed from a corresponding set of twelve equations, with two numerical solutions provided as quorum code portions 33-1 to 33-N to each of the six authorised users. The equations reversibly encode dependencies between elements of the quorum code 33. As will be described below, the numerical solutions are subsequently provided as inputs to the quorum data processing module 31 to solve for unknown values of the reconstructed secret key 19, provided the minimum number M of quorum code portions 33-N are available.

The inputs to the equations are represented as:

$C_0$ $C_1$ $C_2$ $C_3$ $C_4$ $C_5$ $C_6$ $C_7$ $C_8$ $C_9$ where $C_0$ is the variable for the first representative value of the secret key having a value "12", $C_1$ is the variable for the second representative value of the secret key having a value "36", $C_2$ is the variable for the third representative value of the secret key having a value "29", and so on. The solutions to the equations are represented as variables:

$C_{10}$ $C_{11}$ $C_{12}$ $C_{13}$ $C_{14}$ $C_{15}$ $C_{16}$ $C_{17}$ $C_{18}$ $C_{19}$ $C_{20}$ $C_{21}$

As shown in FIG. 9B, the twelve solutions are divided amongst the six participants, with $C_{10}$ and $C_{11}$ in this example given to a first user, $C_{12}$ and $C_{13}$ given to a second user, and so on.

Designating sequences of GF(37) elements as:

| $P_{00}$ | $P_{01}$ | $P_{02}$ | $P_{03}$ | $P_{04}$ | $P_{05}$ | $P_{06}$ | $P_{07}$ | $P_{08}$ | $P_{09}$ | $P_{010}$ | $P_{011}$ | $P_{012}$ | $P_{013}$ | $P_{014}$ | $P_{015}$ | $P_{016}$ | $P_{017}$ | $P_{018}$ | $P_{019}$ | $P_{020}$ | $P_{021}$ |
|---|---|---|---|---|---|---|---|---|---|---|---|---|---|---|---|---|---|---|---|---|---|
| $P_{10}$ | $P_{11}$ | $P_{12}$ | $P_{13}$ | $P_{14}$ | $P_{15}$ | $P_{16}$ | $P_{17}$ | $P_{18}$ | $P_{19}$ | $P_{110}$ | $P_{111}$ | $P_{112}$ | $P_{113}$ | $P_{114}$ | $P_{115}$ | $P_{116}$ | $P_{117}$ | $P_{118}$ | $P_{119}$ | $P_{120}$ | $P_{121}$ |
| $P_{20}$ | $P_{21}$ | $P_{22}$ | $P_{23}$ | $P_{24}$ | $P_{25}$ | $P_{26}$ | $P_{27}$ | $P_{28}$ | $P_{29}$ | $P_{210}$ | $P_{211}$ | $P_{212}$ | $P_{213}$ | $P_{214}$ | $P_{215}$ | $P_{216}$ | $P_{217}$ | $P_{218}$ | $P_{219}$ | $P_{220}$ | $P_{221}$ |
| $P_{30}$ | $P_{31}$ | $P_{32}$ | $P_{33}$ | $P_{34}$ | $P_{35}$ | $P_{36}$ | $P_{37}$ | $P_{38}$ | $P_{39}$ | $P_{310}$ | $P_{311}$ | $P_{312}$ | $P_{313}$ | $P_{314}$ | $P_{315}$ | $P_{316}$ | $P_{317}$ | $P_{318}$ | $P_{329}$ | $P_{320}$ | $P_{321}$ |
| ... | ... | ... | ... | ... | ... | ... | ... | ... | ... | ... | ... | ... | ... | ... | ... | ... | ... | ... | ... | ... | ... |
| $P_{110}$ | $P_{111}$ | $P_{112}$ | $P_{113}$ | $P_{114}$ | $P_{115}$ | $P_{116}$ | $P_{117}$ | $P_{118}$ |  |  | ... |  |  |  |  | $P_{1116}$ | $P_{1117}$ | $P_{1118}$ | $P_{1119}$ | $P_{1120}$ | $P_{1121}$ | the equations are devised so that an unknown value of the quorum code 33 at a position x can be computed by:

$$C_x = -\frac{1}{P_{j,x}} \sum_{k=0, k \neq x}^{21} C_k P_{j,k} \text{ for } j = 0 \text{ to } 11 \qquad \text{Equation (1)}$$

based on known values $C_k$ of the quorum code 33 and computed values from a plurality of quorum sequences ($P_{j,k}$) 39, as will be described below.

These equations are equivalent to $$\sum_{k=0}^{21} C_k P_{j,k} \text{ for } j = 0 \text{ to } 11 \qquad \text{Equation (2)}$$

Since these equations in this case are linear dependencies amongst the variables, solutions may be swapped for input variables and vice versa. In the present worked example, the generated quorum code 33 is represented by the following elements, whose values satisfy the above Equation (2):

$C_0\ C_1\ C_2\ C_3\ C_4\ C_5\ C_6\ C_7\ C_8\ C_9\ C_{10}\ C_{11}\ C_{12}\ C_{13}\ C_{14}\ C_{15}$
$C_{16}\ C_{17}\ C_{18}\ C_{19}\ C_{20}\ C_{21}$

In this embodiment, the sequences of GF(37) elements which define the equations are constructed in a recurrent fashion in order to avoid having to solve the twelve simultaneous equations for the unknowns $C_x$ for x=10 to 21. Accordingly, at step S8-5, the quorum data processing module 31 generates an intermediate sequence ($Q_{j,k}$) 37 for each position x of an unknown value in the quorum code 33, 25 26 28 32 3 19 14 4 21 18 12 0 13 2 17 10 33 5 23 22 20 16 where there is a zero in the twelfth position (k=11), ensuring that $C_{11}$ does not contribute to the equation because $C_{11}$ is unknown at this stage.

This procedure is continued to produce all eleven intermediate sequences ($Q_{i,k}$) 37 as schematically illustrated in FIG. 9B, for the remaining sequences corresponding to an unknown value at a respective position x in the intermediate sequence 37:

| K: | 0 | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|---|
| $Q_{0,k}$ (x = 10) | 13 | 14 | 16 | 20 | 28 | 7 | 2 | 29 | 9 | 6 | 0 | 25 | 1 | 27 | 5 | 35 | 21 | 30 | 11 | 10 | 8 | 4 |
| $Q_{1,k}$ (x = 11) | 25 | 26 | 28 | 32 | 3 | 19 | 14 | 4 | 21 | 18 | 12 | 0 | 13 | 2 | 17 | 10 | 33 | 5 | 23 | 22 | 20 | 16 |
| $Q_{2,k}$ (x = 12) | 12 | 13 | 15 | 19 | 27 | 6 | 1 | 28 | 8 | 5 | 36 | 24 | 0 | 26 | 4 | 34 | 20 | 29 | 10 | 9 | 7 | 3 |
| $Q_{3,k}$ (x = 13) | 23 | 24 | 26 | 30 | 1 | 17 | 12 | 2 | 19 | 16 | 10 | 35 | 11 | 0 | 15 | 8 | 31 | 3 | 21 | 20 | 18 | 14 |
| $Q_{4,k}$ (x = 14) | 8 | 9 | 11 | 15 | 23 | 2 | 34 | 24 | 4 | 1 | 32 | 20 | 33 | 22 | 0 | 30 | 16 | 25 | 6 | 5 | 3 | 36 |
| $Q_{5,k}$ (x = 15) | 15 | 16 | 18 | 22 | 30 | 9 | 4 | 31 | 11 | 8 | 2 | 27 | 3 | 29 | 7 | 0 | 23 | 32 | 13 | 12 | 10 | 6 |
| $Q_{6,k}$ (x = 16) | 29 | 30 | 32 | 36 | 7 | 23 | 18 | 8 | 25 | 22 | 16 | 4 | 17 | 6 | 21 | 14 | 0 | 9 | 27 | 26 | 24 | 20 |
| $Q_{7,k}$ (x = 17) | 20 | 21 | 23 | 27 | 35 | 14 | 9 | 36 | 16 | 13 | 7 | 32 | 8 | 34 | 12 | 5 | 28 | 0 | 18 | 17 | 15 | 11 |
| $Q_{8,k}$ (x = 18) | 2 | 3 | 5 | 9 | 17 | 33 | 28 | 18 | 35 | 32 | 26 | 14 | 27 | 16 | 31 | 24 | 10 | 19 | 0 | 36 | 34 | 30 |
| $Q_{9,k}$ (x = 19) | 3 | 4 | 6 | 10 | 18 | 34 | 29 | 19 | 36 | 33 | 27 | 15 | 28 | 17 | 32 | 25 | 11 | 20 | 1 | 0 | 35 | 31 |
| $Q_{10,k}$ (x = 20) | 5 | 6 | 8 | 12 | 20 | 36 | 31 | 21 | 1 | 35 | 29 | 17 | 30 | 19 | 34 | 27 | 13 | 22 | 3 | 2 | 0 | 33 | except for the last unknown position ($C_x=C_{21}$). In the present worked example, the unknown values of the quorum code 33 are at positions $C_x=C_{10}$ to $C_{21}$, following the sequence of ten known representative values 19' of the secret key 19 at positions $C_x=C_0$ to $C_9$. A value for each element of the intermediate sequences ($Q_{j,k}$) 37 is determined based on the following equation:

$$Q_{j,k} = \alpha^k - \alpha^x$$

for all k=0 to 21, where x is constant for each value of j=0 to the total number of unknown values in the quorum code 33, corresponding to the position of the unknown code element being solved. So for j=0, x=10, for j=1, x=11, and so on, up to j=10, x=20.

In this way, the first intermediate sequence 37 (j=0), for solving the unknown value in position $C_x=C_{10}$, is computed as $Q_{0,k} = \alpha^k - \alpha^{10}$ for all k=0 to 21, producing the following sequence of values:

13 14 16 20 28 7 2 29 9 6 0 25 1 27 5 35 21 30 11 10 8 4 where there is a zero value in the eleventh position because when k=10, $\alpha^k - \alpha^{10} = 0$. This ensures that $C_{10}$ in the quorum code 33 does not contribute to the equation used to solve for an unknown value in position x=10, because $C_{10}$ is an unknown at that stage.

Likewise, the second intermediary sequence (j=1), for position $C_x=C_{11}$, is computed as $Q_{2,k} = \alpha^k - \alpha^{11}$ for all k=0 to 21, producing the following sequence of values:

At step S8-7, the quorum data processing module 31 computes values for a set of quorum sequences ($P_{j,k}$) 39 that will be used to solve for the unknown values of the quorum code 33, based on the intermediate sequences ($Q_{j,k}$) 37 generated at step S8-5. For the first quorum sequence 39 where j=0, all of the values for $P_{0,k}$ are set equal to $\alpha^0=1$, for all k=0 to 21 (noting that $\alpha=2$ in the present worked example). For each subsequent value of j up to 12, the previous $P_{j-1,k}$ sequence is multiplied, element by element, that is pointwise multiplication, by the intermediate sequence $Q_{j,k}$. Put another way, each value of the quorum sequences ($P_{j,k}$) 39, for j>0, is calculated based on the following equation:

$$P_{j,k}|i = P_{j-1,k} \cdot Q_{j,k} \text{ for all } k=0 \text{ to } 21 \quad \text{Equation (3)}$$

Substituting for $P_{j-1,k}$, Equation (3) can be re-written as:

$$P_{j,k} = P_{0,k} \prod_{i=1}^{j} Q_{i,k} \text{ for all } k = 0 \text{ to } 21 \quad \text{Equation (4)}$$

As schematically illustrated in FIG. 9B, the intermediate sequences ($Q_{i,k}$) 37 are substituted into Equation (4) to produce the following twelve quorum sequences ($P_{j,k}$) 39, with $P_{0,k}$ set to $\alpha^0$, as discussed above:

| k: | 0 | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|---|
| $P_{0,k}$ | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| $P_{1,k}$ | 13 | 14 | 16 | 20 | 28 | 7 | 2 | 29 | 9 | 6 | 0 | 25 | 1 | 27 | 5 | 35 | 21 | 30 | 11 | 10 | 8 | 4 |
| $P_{2,k}$ | 29 | 31 | 4 | 11 | 10 | 22 | 28 | 5 | 4 | 34 | 0 | 0 | 13 | 17 | 11 | 17 | 27 | 2 | 31 | 35 | 12 | 27 |
| $P_{3,k}$ | 15 | 33 | 23 | 24 | 11 | 21 | 28 | 29 | 32 | 22 | 0 | 0 | 0 | 35 | 7 | 23 | 22 | 21 | 14 | 19 | 10 | 7 |
| $P_{4,k}$ | 12 | 15 | 6 | 17 | 11 | 24 | 3 | 21 | 16 | 19 | 0 | 0 | 0 | 0 | 31 | 36 | 16 | 26 | 35 | 10 | 32 | 24 |
| $P_{5,k}$ | 22 | 24 | 29 | 33 | 31 | 11 | 28 | 23 | 27 | 19 | 0 | 0 | 0 | 0 | 0 | 7 | 34 | 21 | 25 | 13 | 22 | 13 |
| $P_{6,k}$ | 34 | 14 | 4 | 23 | 5 | 25 | 1 | 10 | 1 | 4 | 0 | 0 | 0 | 0 | 0 | 0 | 5 | 6 | 29 | 8 | 35 | 4 |
| $P_{7,k}$ | 24 | 13 | 17 | 14 | 35 | 20 | 18 | 6 | 25 | 14 | 0 | 0 | 0 | 0 | 0 | 0 | 0 | 17 | 6 | 23 | 26 | 6 |
| $P_{8,k}$ | 36 | 14 | 21 | 8 | 4 | 21 | 14 | 31 | 30 | 34 | 0 | 0 | 0 | 0 | 0 | 0 | 0 | 0 | 34 | 21 | 20 | 29 |
| $P_{9,k}$ | 35 | 5 | 31 | 35 | 31 | 27 | 22 | 3 | 14 | 15 | 0 | 0 | 0 | 0 | 0 | 0 | 0 | 0 | 0 | 16 | 14 | 19 |
| $P_{10,k}$ | 31 | 20 | 1 | 17 | 3 | 30 | 9 | 20 | 23 | 14 | 0 | 0 | 0 | 0 | 0 | 0 | 0 | 0 | 0 | 0 | 9 | 34 |
| $P_{11,k}$ | 7 | 9 | 8 | 19 | 23 | 7 | 20 | 13 | 23 | 9 | 0 | 0 | 0 | 0 | 0 | 0 | 0 | 0 | 0 | 0 | 0 | 12 |

At step S8-9, the quorum data processing module 31 generates a quorum code 33 based on the representative values of the secret key 19 determined at step S8-3, and the values of $P_{j,k}$ computed at step S8-7. Each element of the quorum code 33 is determined based on Equation (1) above. In the present worked example, it can be seen that the last sequence, $P_{11,k}$, corresponds to the sequence of values for solving the unknown value at position $C_x=C_{21}$ of the quorum code 33, and has zeros in the eleventh to twenty-first positions (k=10 to 20). Using this sequence in Equation (1) produces the solution to $C_{21}$:

$$C_{21} = -\frac{1}{P_{11,21}} \sum_{k=0, k \neq 21}^{21} C_k P_{11,k}$$

which is found to be $C_{21}=-30 \pmod{37}=7$.

Using the penultimate sequence in Equation (1) produces the solution to $C_{20}$, which is found to be $C_{20}=34$. Continuing in this way, the quorum sequences for the remaining positions of unknown values are used in reverse order, from $C_x=C_{19}$ to $C_{10}$, in Equation (1), until all unknown values for the complete quorum code 33 are determined. As shown in FIG. 9B, the generated quorum code 33 in the present worked example is:

12 36 29 22 30 6 17 17 2 8 9 4 13 9 9 24 36 9 18 19 34 7 where the first ten values ($C_0$ to $C_9$) correspond to the representative values 19' of the secret key, and the following twelve values ($C_{10}$ to $C_{21}$) correspond to the computed solutions.

At step S8-9, the quorum data processing module 31 identifies the predetermined portions of the quorum code 33 for each authorised user, and transmits the identified quorum code portions 33-1 to 33-N to the respective computing devices 3-1 to 3-N. Referring again to FIG. 9B, the six quorum participants are provided with the respective assigned equation solutions:

Participant 1: $C_{10}$ and $C_{11}$=9 4
Participant 2: $C_{12}$ and $C_{13}$=13 9
Participant 3: $C_{14}$ and $C_{15}$=9 24
Participant 4: $C_{16}$ and $C_{17}$=36 9
Participant 5: $C_{18}$ and $C_{19}$=18 19
Participant 6: $C_{20}$ and $C_{21}$=34 7

Records of the complete quorum code 33 and the various data sequences can then be deleted from working memory.

Figure 10:
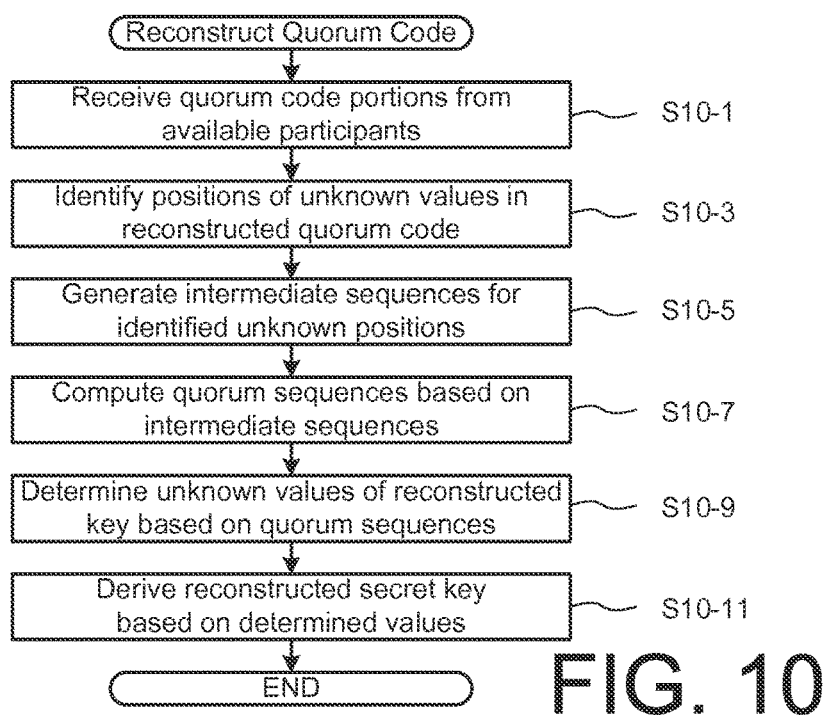
FIG. 10 is a flow diagram of a process for reconstructing a quorum code according to the second embodiment of the invention.
Figure 11:
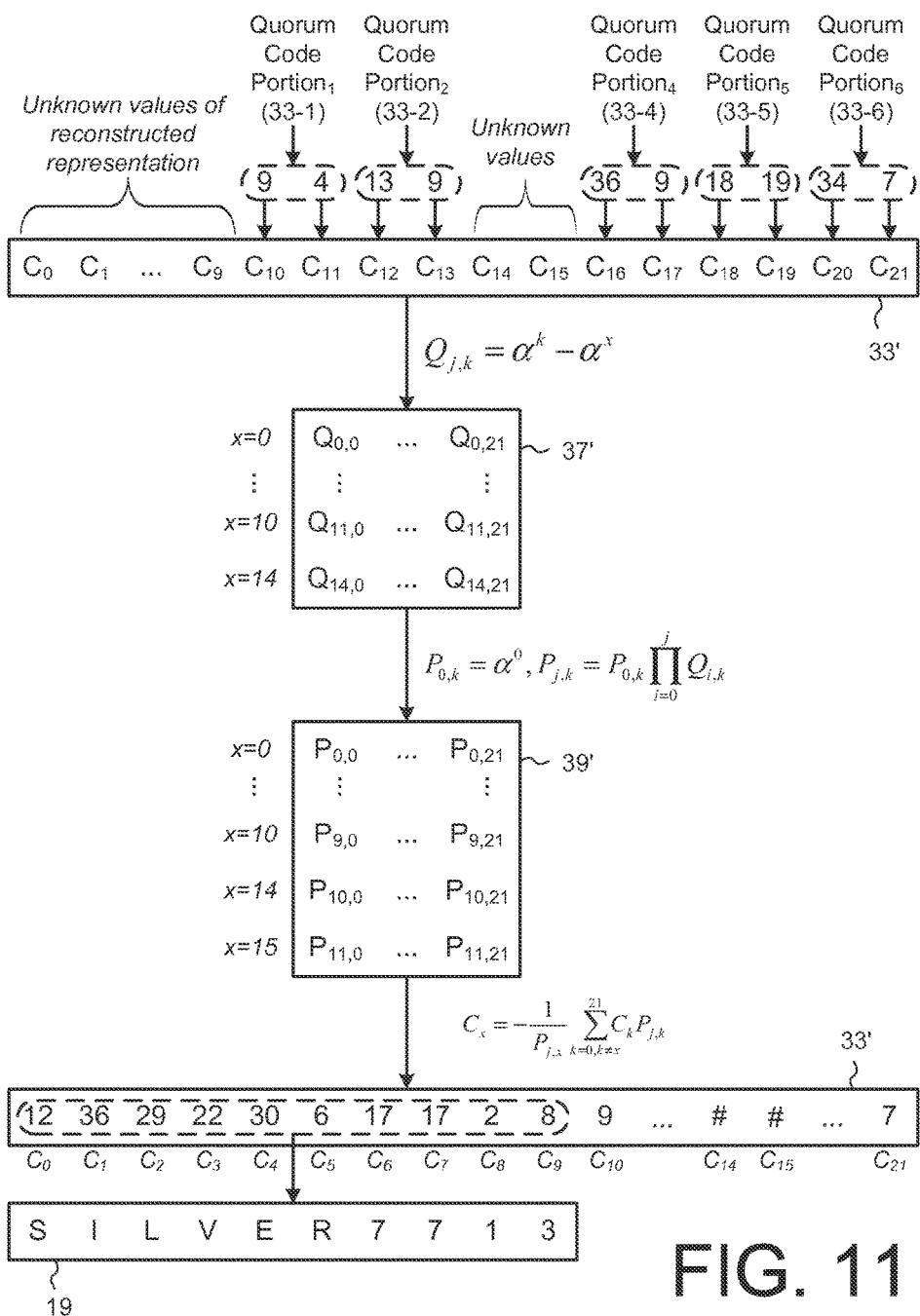
FIG. 11 is a schematic block diagram of a worked example of reconstructing a quorum code according to the second embodiment.

FIG. 10 is a flow diagram for an example computer-implemented process of reconstructing the original secret key 19 from a predefined minimum number of received quorum code portions 33-N, according to the present embodiment. Reference is also made to FIG. 11, which is a schematic illustration of the worked example continued from FIGS. 9A and 9B. In the present embodiment, any five participants need to come together to be able to reconstruct the quorum code 33 and hence the secret key 19. As shown in FIG. 10, at step S10-1, the quorum data processing module 31 receives respective quorum code portions 33-N from the respective computing devices 3 of available participants. Similar to the first embodiment described above, the applications 9 of the computing devices 3 can be configured to retrieve the stored quorum code portions 33-N from the memory 23 and communicate the data to the quorum data processing module 31 via the application interface 7 of the quorum system 5, for example in response to a request from the quorum data processing module 31.

Referring to the example illustrated in FIG. 11, if all participants except Participant 3 provide their respective quorum code portions 33-N together, the quorum data processing module 31 collectively receives the following unknown ($C_x$) and known values for a reconstructed quorum code 33':

$C_0$ $C_1$ $C_2$ $C_3$ $C_4$ $C_5$ $C_6$ $C_7$ $C_8$ $C_9$ 9 4 13 9 $C_{14}$ $C_{15}$ 36 9 18 19 34 7

The values of the reconstructed quorum code 33' ($C_0$ $C_1$ $C_2$ $C_3$ $C_4$ $C_5$ $C_6$ $C_7$ $C_8$ $C_9$) corresponding to the representative values 19' of the secret key 19, as well as the values at positions $C_x=C_{14}$ and $C_{15}$, corresponding to the quorum code portions 33-3 from missing Participant 3, are unknown at this stage. However these values can be solved using Equation (2) and suitable computed quorum sequences 39', $P_{j,k}$. Accordingly, at step S10-3, the quorum data processing module 31 identifies the positions of all unknown values in the reconstructed quorum code 33'. The quorum data processing module 31 then proceeds to perform processing to solve for the unknown values, in a similar way to the quorum code generation process described above.

For the code reconstruction process, a different set of intermediate sequences 37' are needed to solve for the unknown values in the positions identified at step S10-3. Therefore, at step S10-5, the quorum data processing module 31 generates an intermediate sequence ($Q_{j,k}$) 37 for each position x of an unknown value in the reconstructed quorum code 33', similar to the processing described above with reference to step S8-5 of the quorum code generation process. It is appreciated that all of the intermediate sequences for a quorum code of a predetermined length may be pre-computed one time by the quorum data processing module 31 based on a particular mapping table 35 as described above, and stored in a database (not shown) of the quorum system 5 for subsequent retrieval at step S10-5.

As shown in FIG. 11, twelve intermediate sequences ($Q_{i,k}$) 37' are generated, corresponding to respective identified positions of unknown values in the reconstructed quorum code 33' ($C_x=C_0$ to $C_9$, $C_{14}$ and $C_{15}$). For example, the first intermediary sequence in this case (j=0), for position $C_x=C_0$, is computed as $Q_{0,k}=\alpha^k-\alpha^0$ for all k=0 to 21, producing a sequence with a zero in the first position:

0 1 3 7 15 31 26 16 33 30 24 12 25 14 29 22 8 17 35 34 32 28

Similarly, intermediate sequences 37' for respective unknown values in the second to tenth positions (x=1 to 9) are computed, to obtain the following set of intermediate sequences 37' in the quorum code reconstruction process:

fifteenth position (k=14). Using the values of this computed quorum sequence ($P_{11,k}$) in Equation (1) produces the solution to $C_{15}$, which is found to be $C_{15}=24$. The penultimate sequence is then used in Equation (1) to produce the solution to $C_{14}$, which is found to be $C_{14}=9$.

Continuing in this way, using the computed values of the quorum sequences ($P_{j,k}$) 39' in reverse order with Equation (1) enables each unknown symbol in the reconstructed quorum code 33' to be determined, resulting in the following sequence of values:

| K: | 0 | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|---|
| $Q_{0,k}$ (x = 0) | 0 | 1 | 3 | 7 | 15 | 31 | 26 | 16 | 33 | 30 | 24 | 12 | 25 | 14 | 29 | 22 | 8 | 17 | 35 | 34 | 32 | 28 |
| $Q_{1,k}$ (x = 1) | 36 | 0 | 2 | 6 | 14 | 30 | 25 | 15 | 32 | 29 | 23 | 11 | 24 | 13 | 28 | 21 | 7 | 16 | 34 | 33 | 31 | 27 |
| $Q_{2,k}$ (x = 2) | 34 | 35 | 0 | 4 | 12 | 28 | 23 | 13 | 30 | 27 | 21 | 9 | 22 | 11 | 26 | 19 | 5 | 14 | 32 | 31 | 29 | 25 |
| $Q_{3,k}$ (x = 3) | 30 | 31 | 33 | 0 | 8 | 24 | 19 | 9 | 26 | 23 | 17 | 5 | 18 | 7 | 22 | 15 | 1 | 10 | 28 | 27 | 25 | 21 |
| $Q_{4,k}$ (x = 4) | 22 | 23 | 25 | 29 | 0 | 16 | 11 | 1 | 18 | 15 | 9 | 34 | 10 | 36 | 14 | 7 | 30 | 2 | 20 | 19 | 17 | 13 |
| $Q_{5,k}$ (x = 5) | 6 | 7 | 9 | 13 | 21 | 0 | 32 | 22 | 2 | 36 | 30 | 18 | 31 | 20 | 35 | 28 | 14 | 23 | 4 | 3 | 1 | 34 |
| $Q_{6,k}$ (x = 6) | 11 | 12 | 14 | 18 | 26 | 5 | 0 | 27 | 7 | 4 | 35 | 23 | 36 | 25 | 3 | 33 | 19 | 28 | 9 | 8 | 6 | 2 |
| $Q_{7,k}$ (x = 7) | 21 | 22 | 24 | 28 | 36 | 15 | 10 | 0 | 17 | 14 | 8 | 33 | 9 | 35 | 13 | 6 | 29 | 1 | 19 | 18 | 16 | 12 |
| $Q_{8,k}$ (x = 8) | 4 | 5 | 7 | 11 | 19 | 35 | 30 | 20 | 0 | 34 | 28 | 16 | 29 | 18 | 33 | 26 | 12 | 21 | 2 | 1 | 36 | 32 |
| $Q_{9,k}$ (x = 9) | 7 | 8 | 10 | 14 | 22 | 1 | 33 | 23 | 3 | 0 | 31 | 19 | 32 | 21 | 36 | 29 | 15 | 24 | 5 | 4 | 2 | 35 |
| $Q_{10,k}$ (x = 14) | 13 | 14 | 16 | 20 | 28 | 7 | 2 | 29 | 9 | 6 | 0 | 25 | 1 | 27 | 5 | 35 | 21 | 30 | 11 | 10 | 8 | 4 |

At step S10-7, the quorum data processing module 31 computes values for a set of quorum sequences ($P_{j,k}$) 39 that will be used to solve for the unknown values of the reconstructed quorum code 33', based on the intermediate sequences ($Q_{j,k}$) 37 generated at step S10-5. As schematically illustrated in FIG. 11, the eleven intermediate sequences ($Q_{j,k}$) 37' are substituted into Equation (4) in a similar as discussed above with reference to step S8-7 in the quorum key generation process, to produce the following twelve quorum sequences ($P_{j,k}$) 39':

12 36 29 22 30 6 17 17 2 8 9 4 13 9 924 36 9 18 19 34 7

At step S10-11, the quorum data processing module 31 derives the reconstructed secret key 19 by mapping the computed representative values from locations $C_0$ to $C_9$ of the reconstructed quorum code 33' to the corresponding symbol in the mapping table 35. In the worked example of FIG. 9B, looking up the first ten GF(37) values of the reconstructed sequence of values at $C_0$ to $C_9$ using Table 1 produces the reconstructed password "SILVER7713".

| k: | 0 | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|---|
| $P_{0,k}$ | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| $P_{1,k}$ | 0 | 1 | 3 | 7 | 15 | 31 | 26 | 16 | 33 | 30 | 24 | 12 | 25 | 14 | 29 | 22 | 8 | 17 | 35 | 34 | 32 | 28 |
| $P_{2,k}$ | 0 | 0 | 6 | 5 | 25 | 5 | 21 | 18 | 20 | 19 | 34 | 21 | 8 | 34 | 35 | 18 | 19 | 13 | 6 | 12 | 30 | 16 |
| $P_{3,k}$ | 0 | 0 | 0 | 20 | 4 | 29 | 2 | 12 | 8 | 32 | 11 | 4 | 28 | 4 | 22 | 9 | 21 | 34 | 7 | 2 | 19 | 30 |
| $P_{4,k}$ | 0 | 0 | 0 | 0 | 32 | 30 | 1 | 34 | 23 | 33 | 2 | 20 | 23 | 28 | 3 | 24 | 21 | 7 | 11 | 17 | 31 | 1 |
| $P_{5,k}$ | 0 | 0 | 0 | 0 | 0 | 36 | 11 | 34 | 7 | 14 | 18 | 14 | 8 | 9 | 5 | 20 | 1 | 14 | 35 | 27 | 9 | 13 |
| $P_{6,k}$ | 0 | 0 | 0 | 0 | 0 | 0 | 19 | 8 | 14 | 23 | 22 | 30 | 26 | 32 | 27 | 5 | 14 | 26 | 29 | 7 | 9 | 35 |
| $P_{7,k}$ | 0 | 0 | 0 | 0 | 0 | 0 | 0 | 31 | 24 | 18 | 30 | 24 | 11 | 23 | 7 | 17 | 7 | 25 | 2 | 19 | 17 | 33 |
| $P_{8,k}$ | 0 | 0 | 0 | 0 | 0 | 0 | 0 | 0 | 1 | 30 | 18 | 15 | 25 | 28 | 17 | 28 | 18 | 25 | 1 | 9 | 13 | 26 |
| $P_{9,k}$ | 0 | 0 | 0 | 0 | 0 | 0 | 0 | 0 | 0 | 21 | 23 | 18 | 22 | 23 | 6 | 25 | 31 | 7 | 2 | 9 | 24 | 18 |
| $P_{10,k}$ | 0 | 0 | 0 | 0 | 0 | 0 | 0 | 0 | 0 | 0 | 10 | 9 | 1 | 2 | 31 | 22 | 21 | 20 | 10 | 36 | 11 | 1 |
| $P_{11,k}$ | 0 | 0 | 0 | 0 | 0 | 0 | 0 | 0 | 0 | 0 | 24 | 32 | 33 | 7 | 0 | 31 | 3 | 19 | 23 | 32 | 33 | 36 |

At step S10-11, the quorum data processing module 31 determines the unknown values of the reconstructed quorum code 33' based on the values of the quorum sequences ($P_{j,k}$) computed at step S10-7. Each unknown element of the reconstructed quorum code 33' is determined based on Equation (1) above. Similar to before, it can be seen in the present worked example that the last sequence, $P_{11,k}$, has zeros in the positions in all but one of the unknowns. The zeros are in the first to tenth positions (k=0 to 9) and the The present embodiment thereby provides a robust system that can be efficiently extendible to handle any minimum number of quorum participants, by creating a linear dependency between symbols in the form of simultaneous linear equations represented by computed coefficients. As those skilled in the art will appreciate, the equations need not be linear and alternative forms of dependency equations are envisaged, in which a system of equations may be formed to construct a dependency between symbols or characters of an encryption key, authentication key or password and the solutions of said equations. The only constraint is that the generation process be reversible in that the previous input variables need to have unique solutions when the previous solutions provide the inputs. Such concepts may be based on known principles in the field of information theory, for example as discussed within the different context of error correcting codes, in the text book "The Theory of Error-Correcting Codes" by F. J. MacWilliams and N J. A. Sloane, published by North-Holland.

Third Embodiment

A third embodiment of the invention will now be described using corresponding reference numerals to those of preceding figures where appropriate for corresponding elements, where the quorum system 5 of the first embodiment described above is adapted to detect and identify falsified, manipulated, corrupted or otherwise erroneous quorum code portions, based on additional information that is available when the number of received quorum code portions is greater than the predefined minimum number required to reconstruct the original secret data. Errors may be introduced to a particular quorum code portion 33 for example during transmission of the data between entities or storage of the data on a medium such as a magnetic card, resulting in one or more corrupted values. Errors may also be present in a purported quorum code portion 33 generated by a fraudster trying to gain access to the original secret data.

In a worked example for the present embodiment, a quorum of six out of seven participants is defined in order to reconstruct the original secret, e.g. the alphanumeric password "SILVER". It will be appreciated that any number of participants can be defined, with the minimum character length of the secret data 19 calculated accordingly in order to facilitate the predefined quorum. As will be described below, the quorum data processing module 31 is adapted to detect that a received quorum portion 33 is in error by encoding redundancy or known constants into the original secret data 19, and subsequently trying all received quorum combinations in turn and processing the reconstructed secret to determine if the encoded redundancy or known constants are present. In this example, the original secret is repeated to form secret data 19 consisting the characters "SILVERSIL-VER", thereby enabling detection of errors when the reconstructed data does not include the predefined redundant data. It will be appreciated that the fourteen characters of the resulting secret data 19 can be processed by the quorum data processing module 31 to construct seven code portions 33-1 to 33-7, each consisting of two values, based on the quorum code generation process described above with reference to FIG. 2, for distribution to respective ones of the seven participants, denoted as $I_1$, $I_2$, $I_3$, $I_4$, $I_5$, $I_6$ and $I_7$.

Figure 12:
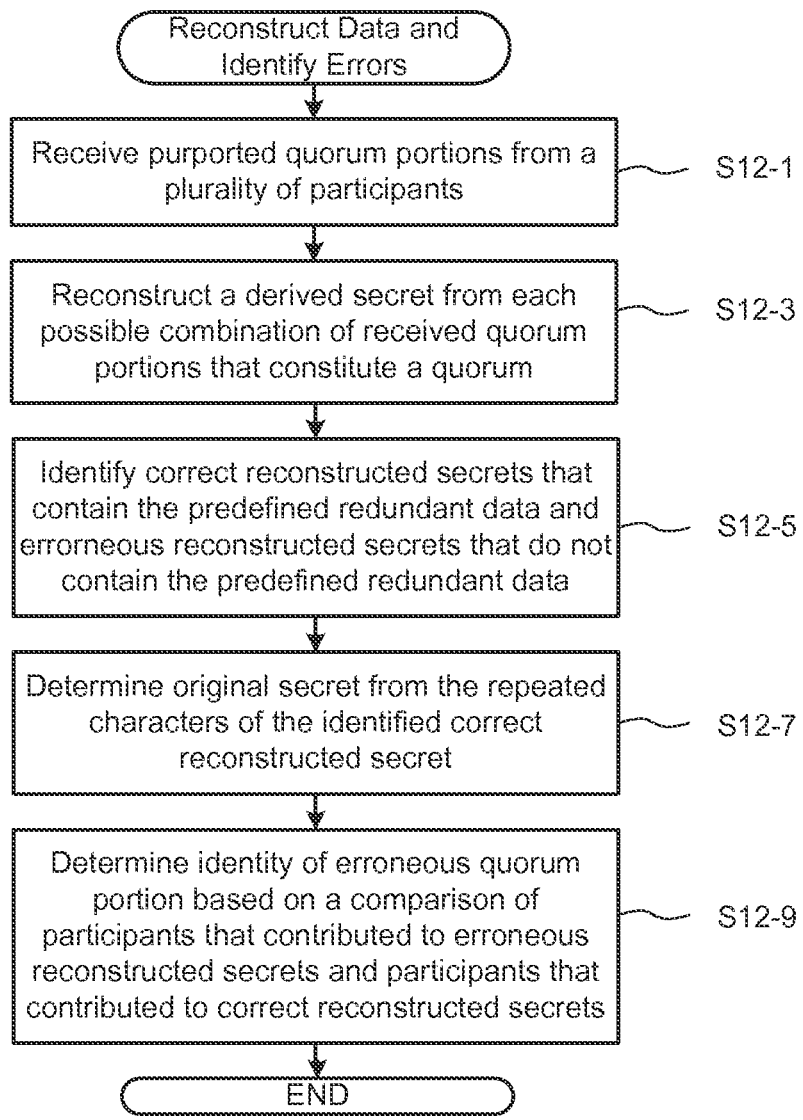
FIG. 12 is a flow diagram of a process for reconstructing original secret data based on received quorum portions and identifying errors in the received quorum portions according to a third embodiment of the invention.

FIG. 12 is a flow diagram for an example computer-implemented process of reconstructing the original secret data 19 based on received quorum portions 33 and identifying errors in received quorum portions 33. At step S12-1, a plurality of quorum portion 33 are received by the quorum data processing module 31. Following from the worked example of this embodiment, each of the seven participants presents their respective quorum portion 33-1 to 33-7 to the quorum system 5. Therefore, the system 5 receives one additional quorum portion 33 than required to reconstruct the original secret data 19. Furthermore, participant $I_4$ in this example presents an incorrect or otherwise erroneous quorum portion 33-4.

At step S12-3, the quorum data processing module 31 reconstructs a derived secret based on each possible combination of received quorum portions 33 that constitute a predefined quorum, for example based on the reconstruction process as described above with reference to FIG. 4. In the present worked example, there are seven ways in which a quorum of six can be formed from seven participants. The participant combinations and corresponding reconstructed secrets obtained by the quorum data processing module 31 are listed below:

| Participant quorum | Reconstructed secret |
| --- | --- |
| $I_1$, $I_2$, $I_3$, $I_4$, $I_5$, $I_6$ | VSFMM252BRD3 |
| $I_2$, $I_3$, $I_4$, $I_5$, $I_6$, $I_7$ | 88AI95VKG116 |
| $I_1$, $I_3$, $I_4$, $I_5$, $I_6$, $I_7$ | JSSUNMO709BY |
| $I_1$, $I_2$, $I_4$, $I_5$, $I_6$, $I_7$ | MW9OKZEVVDJE |
| $I_1$, $I_2$, $I_3$, $I_5$, $I_6$, $I_7$ | SILVERSILVER |
| $I_1$, $I_2$, $I_3$, $I_4$, $I_6$, $I_7$ | 2KZ3DDK56PN8 |
| $I_1$, $I_2$, $I_3$, $I_4$, $I_5$, $I_7$ | Z4O9ACMZ0EZN |

At step S12-5, the quorum data processing module 31 determines the reconstructed secrets that contain the predefined redundant data, thus deemed to be correct, and also determines the reconstructed secrets that do not contain the predefined redundant data, thus deemed to be erroneous or corrupted. In this example, the only case where the reconstructed secret contains a repeated portion is for the quorum with participant combination $I_1$, $I_2$, $I_3$, $I_5$, $I_6$, $I_7$, where the quorum portion 33-4 associated with participant 14 does not contribute to the reconstructed secret. At step S12-7, the quorum data processing module 31 derives the original secret, "SILVER", from the repeated characters of the identified correct reconstructed secret. The quorum data processing module 31 can also determine, at step S12-9, that the quorum portion 33 presented by participant $I_4$ is corrupted, based on a comparison of the participants that contributed to erroneous reconstructed secrets and the participants that contributed to correct reconstructed secrets. For example, the quorum data processing module 31 can determine that participant $I_4$ does not contribute to the correct reconstructed secret and/or that participant $I_4$ is the only common participant contributing to the erroneous reconstructed secrets.

It will be appreciated that identification of the or each participant providing an erroneous portion may only be possible depending on the number of total quorum participants and the number of additional quorum portions received above the minimum required to reconstruct the original secret. With a smaller quorum and/or a greater number of participants, there are more quorum combinations and more information is made available for the quorum data processing module 31 to detect an error in a received quorum portion. For example, extending the above worked example to a quorum of six out of a total of twelve participants, each receiving two code values instead of one. When eight participants present respective quorum portions to the system 5, there would be twenty-eight different ways in which a quorum of six can be formed. When only one of the presented quorum portion contains an error, the reconstructed secret "SILVERSILVER" would be derived correctly seven times.

In the above worked example, redundancy is encoded by repeating the original secret. It will be appreciated that there are a variety of alternative ways in which redundant data may be encoded or introduced in to the secret data. One example is to calculate and append a hash of the original secret before generating the quorum portions 33, and to subsequently check that a hash, such as SHA or Cyclic Redundancy Check (CRC), of the reconstructed secret satisfies the appended hash value in the corresponding received portion. The hash function may be one of any known standard functions, such as hash message authentication code (HMAC) based functions as defined by the RFC2104 standard (http://tools.ietf.org/html/rfc2104), Secure Hash Algorithm (SHA) (SHA) based functions (e.g. http://tools.ietf.org/html/rfc5754), or Cyclic Redundancy Check (CRC) based functions. As another example, each generated quorum portion may consists of portions M and X, where M is the data vector used in quorum processing as described above, followed by a data vector X, which could be a known data value, such as a GPS coordinate corresponding to a predefined location, or a pre-stored randomly chosen value. Additionally, the data vector portion X could be encrypted before appending to the quorum portion for distribution. As yet another alternative, the data vector portion X could be a function of M, such as a cryptographic hash whereby X=hash(M), or an encrypted version of M, or a CRC/parity check based on M, or selected or permuted portions of M, etc.

Fourth Embodiment

Figure 13:
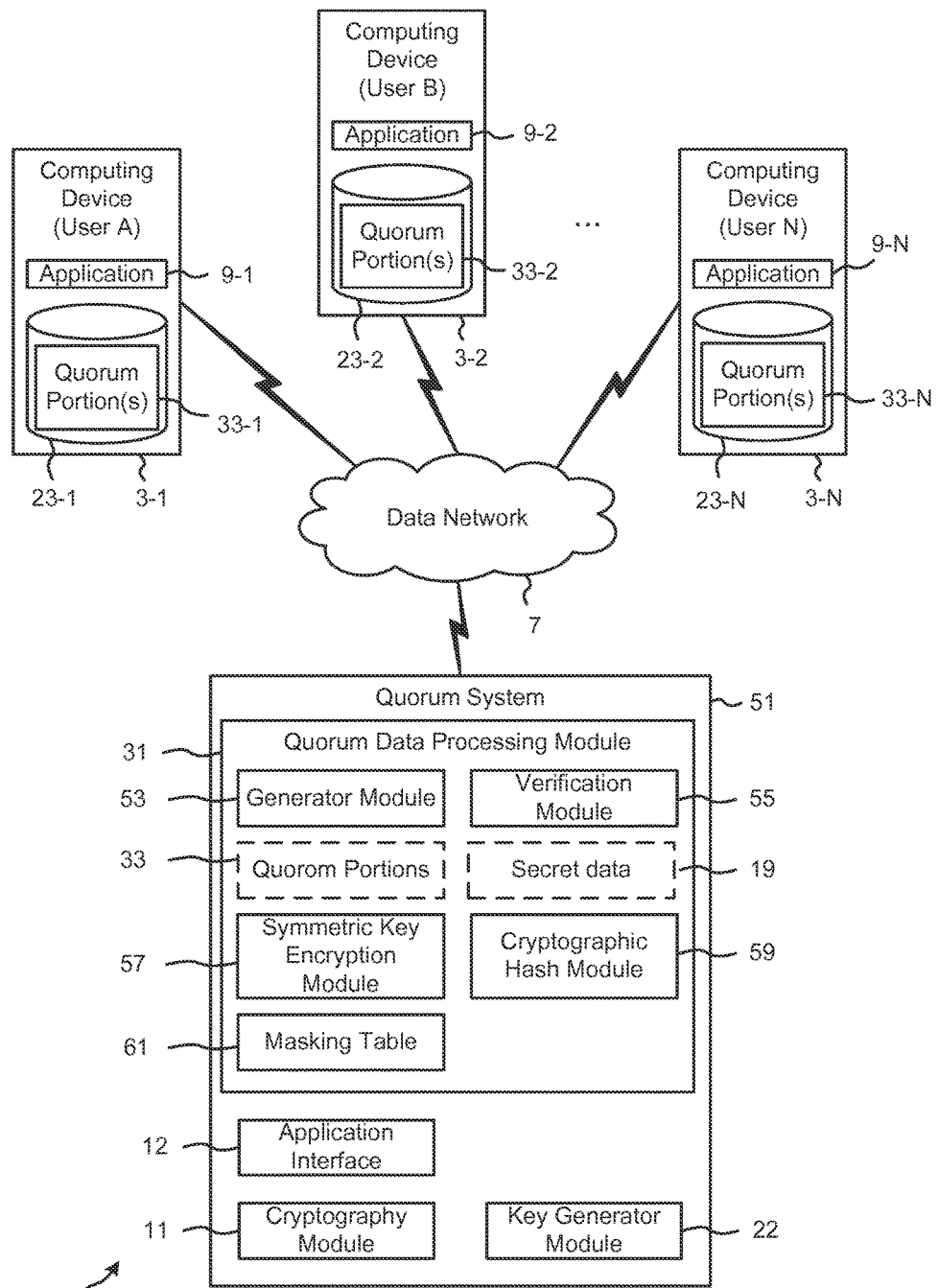
FIG. 13 is a block diagram showing the main components of a quorum data recovery system according to a fourth embodiment of the invention.

A fourth embodiment of the invention will now be described with reference to FIG. 13, using corresponding reference numerals to those of preceding figures where appropriate for corresponding elements. As shown in FIG. 13, the quorum data recovery system 1 comprises a plurality of computing devices 3-1 to 3-N, each computing device 3 in communication with a quorum system 51 via a data network 7. Similar to the first embodiment described above, the quorum system 51 also includes a quorum data processing module 31, and can also include a cryptography module 12, an application interface 12 and a key generator module 22.

In this embodiment, the quorum data processing module 31 includes a quorum data generator module 53 that generates a plurality of quorum portions 33 based on original secret data 19, such as an encryption/decryption key or a sensitive data file, for distribution to respective computing devices 3-1 to 3-N, whereby at least a predefined minimum number of the quorum portions 33 are required in order to reconstruct the original secret data. The quorum data processing module 31 also includes a quorum data verification module 55 that receives a plurality of quorum portions 33 from a quorum of authorised participants and reconstructs the original secret data 19. The quorum data verification module 55 is also configured to determine and identify when one or more of the received quorum portions 33 contains an error.

As will be described in more detail below, the quorum data generator module 53 and verification module 55 perform symmetric key encryption, for example provided by a symmetric key encryption module 57 configured to carry out AES-based encryption and decryption, as is well-known in the art. The generator module 53 and the verification module 55 also perform computation of cryptographic hash digests, for example provided by a cryptographic hash module 59 configured to carry out cryptographic hash functions, such as HMAC or SHA, which both of a type that is known per se and need not be described further.

Figure 14:
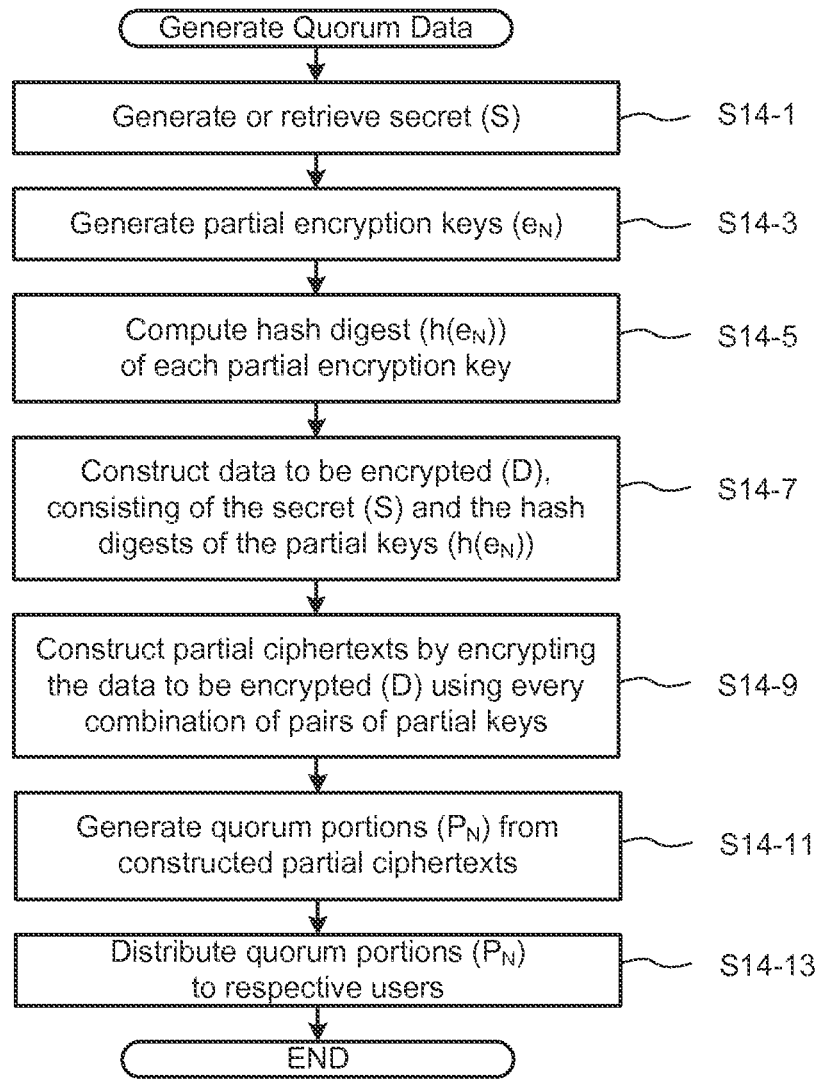
FIG. 14 is a flow diagram for a process of generating quorum portions according to a fifth embodiment of the invention.

A more detailed description of the operation of these components in this embodiment will now be given with reference to a worked example with a quorum of two out of a total of four participants, denoted as $I_1$ to $I_4$. FIG. 14 is a flow diagram for an example computer-implemented process of generating quorum portions 33 according to the present embodiment. Referring to FIG. 14, at step S14-1, the generator module 53 retrieves the secret data 19 to be encoded and distributed to the authorised participants. For example, the generator module 53 may request a secret key from the key generator module 22. Alternatively, the secret data may be input to the system 5 via the application interface 12. At step S14-3, the generator module 53 generates a partial encryption key, $e_1$ to $e_4$, for each of the total number of participants $I_1$ to $I_4$. Each partial encryption key $e_N$ may be derived from one half of a symmetric encryption key, which may be pseudo-randomly or randomly generated or chosen from a predefined list of available keys.

At step S14-5, the generator module 53 computes a hash digest, $h(e_1)$ to $h(e_4)$, for each of the partial encryption keys, $e_1$ to $e_4$, for example using the cryptographic hash module 59. It will be appreciated that the generator module 53 may instead be configured to carry out a standard cryptographic hash function on the respective partial encryption keys. At step S14-7, the generator module 53 constructs a unique data string, D, consisting of the secret data S followed by the computed hash digests, $h(e_1)$ to $h(e_4)$, of the partial keys, $e_1$ to $e_4$:

$$D=S,h(e_1),h(e_2),h(e_3),h(e_4)$$

At step S14-9, the generator module 53 constructs a plurality of partial ciphertexts, $C_1$ to $C_4$, by encrypting the unique data string, D, using every combination of pairs of partial keys, $e_1$ to $e_4$, for example using the symmetric key encryption module 57. It will be appreciated that the generator module 53 may instead be configured to carry out standard symmetric key encryption based on the input data string and pairs of partial encryption keys. Following from the worked example of the present embodiment, the unique data string, D, is encrypted with an encryption key formed from the corresponding partial keys, $e_1$ and $e_2$, where the unique data string D has the same length as the combined partial keys $e_1$ and $e_2$. The output ciphertext, having the same length as the input data string and encryption key, is partitioned into two ciphertext portions of equal length. The first half of the output ciphertext is assigned as the next partial ciphertext for participant $I_1$, corresponding to the first partial key $e_1$, and the second half is assigned as the next partial ciphertext for participant 12, these being the first portions constructed for each participant, denoted as partial ciphertexts $C_1(a)$ and $C_2(a)$. The remaining partial ciphertexts are similarly constructed by encrypting the unique data string, D, with an encryption key formed from the remaining pairs of partial keys. The following table sets out the resulting set of partial ciphertexts generated for each combination of partial encryption keys, which may be stored by the quorum data processing module 31 as a masking table 61:

| Partial keys | | Partial Ciphertexts | |
| --- | --- | --- | --- |
| $e_1$ | $e_2$ | $C_1(a)$ | $C_2(a)$ |
| $e_1$ | $e_3$ | $C_1(b)$ | $C_3(a)$ |
| $e_1$ | $e_4$ | $C_1(c)$ | $C_4(a)$ |
| $e_2$ | $e_3$ | $C_2(b)$ | $C_3(b)$ |
| $e_2$ | $e_4$ | $C_2(c)$ | $C_4(b)$ |
| $e_3$ | $e_4$ | $C_3(c)$ | $C_4(c)$ |

Having constructed the partial ciphertexts, the generator module 53 generates quorum portions, P1 to P4, from the constructed partial ciphertexts. In this worked example, the quorum portions $P_1$ to $P_4$ each consist of the sequence of three partial ciphertexts, $C_N(a)$ to $C_N(c)$, followed by a randomly chosen partial encryption key $e_N$, with:

$$P_1 = C_1(a), C_1(b), C_1(c), e_1$$

$$P_2 = C_2(a), C_2(b), C_2(c), e_2$$

$$P_3 = C_3(a), C_3(b), C_3(c), e_3$$

$$P_4 = C_4(a), C_4(b), C_4(c), e_4$$

At step S14-13, the quorum system 5 distributes the generated quorum portions to the respective participants.

Figure 15:
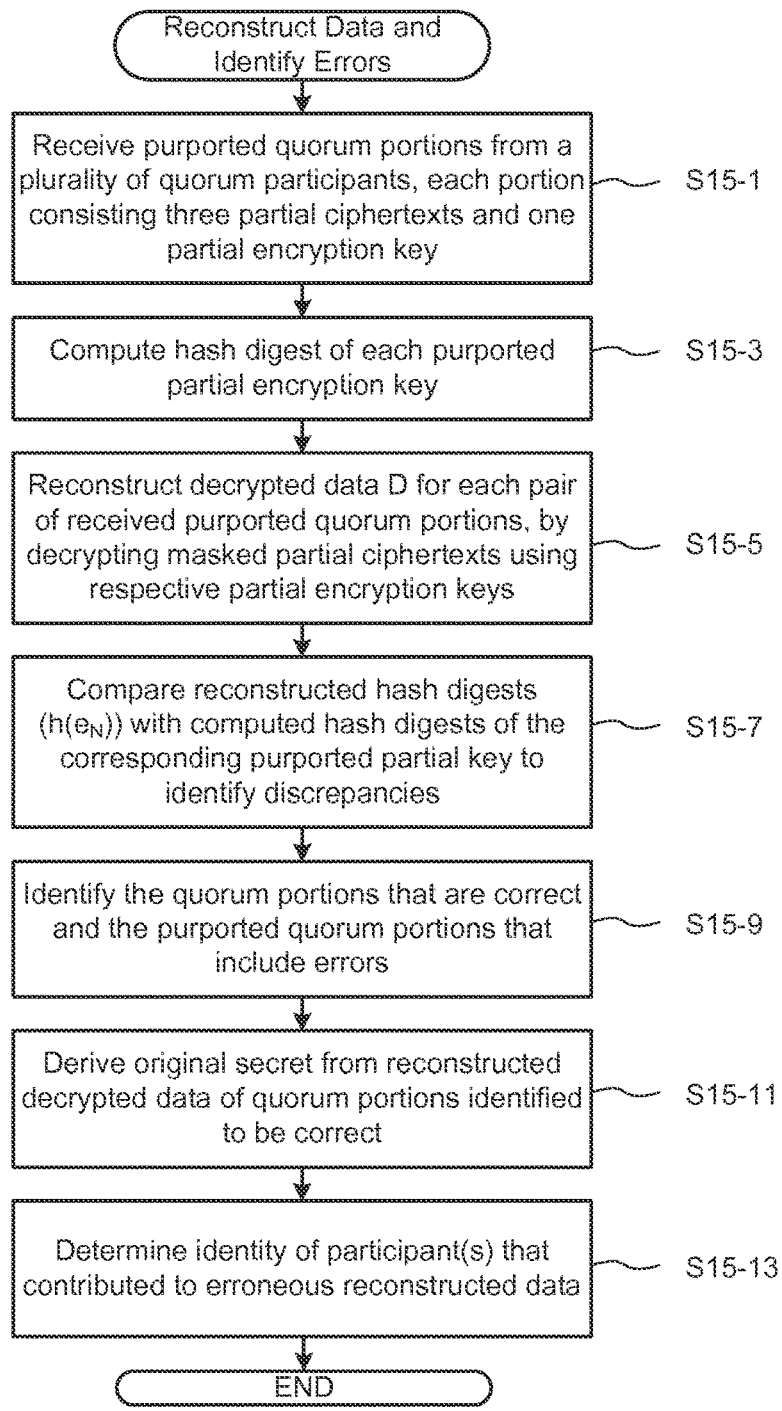
FIG. 15 is a flow diagram for a process of detecting errors in received quorum portions according to the fifth embodiment of the invention.

FIG. 15 is a flow diagram for an example computer-implemented process of detecting errors in quorum portions received from users purporting to be authorized quorum participants. At step S15-1, the verification module 55 receives purported quorum portions from a plurality of quorum participants, each portion consisting three partial ciphertexts and one partial encryption key. Following from the above worked example for the present embodiment, participants $I_1$, $I_2$, and $I_4$ come forward to form a quorum and present the following respective portions to the quorum system 5:

$$R_1 = C_1(a), C_1(b), C_1(c), e_1$$

$$R_2 = F_1, F_2, F_3, e_x$$

$$R_4 = C_4(a), C_4(b), C_4(C), e_4$$

where participant $I_2$ presents a fake or erroneous set of partial ciphertexts, $F_1$, $F_2$, $F_3$. The associated partial encryption key may be correct or incorrect, such that $e_x = e_2$ or $e_x \neq e_2$.

At step S15-3, the verification module 55 calculates the hashes, $h(e_1)$, $h(e_x)$ and $h(e_4)$, of each received partial encryption key, for example using the cryptographic hash module 59. At step S15-5, the verification module 55 reconstructs decrypted data D for each pair of received purported quorum portions, by decrypting masked partial ciphertexts using respective partial encryption keys, for example using the symmetric key encryption module 53. The verification module 55 can identify and mask out the respective partial ciphertexts from the respective received quorum portions, for each pair of received partial encryption keys, based on the data stored in the masking table 61 as described above. It will be appreciated that the information set out in the masking table 61 can instead be included in the verification module 55.

Referring back to the worked example, the verification module 55 reconstructs decrypted data $D_{1,2}$ based on the received partial keys $e_1$ and $e_x$ from purported quorum portions $R_1$ and $R_2$, by decrypting respective masked portions $C_1(a)$ and $F_1$. When either the partial ciphertext or decryption key is incorrect, the decryption result is similar to producing a random output, denoted in this example by:

$$D_{1,2} = Z_1, Z_2, Z_3, Z_4, Z_6$$

The verification module 55 similarly decrypts the other combinations of received purported quorum portions, producing the following complete set of reconstructed values:

| Partial keys | Masked partial ciphertexts | | Reconstructed data |
|---|---|---|---|
| $e_1$ | $e_x(e_2)$ | $C_1(a)$ $F_1$ | $D_{1,2} = Z_1, Z_2, Z_3, Z_4, Z_5$ |
| $e_1$ | $e_4$ | $C_1(c)$ $C_4(a)$ | $D_{1,4} = S, h(e_1), h(e_2), h(e_3), h(e_4)$ |
| $e_x(e_2)$ | $e_4$ | $F_3$ $C_4(b)$ | $D_{2,4} = Z_6, Z_7, Z_8, Z_9, Z_{10}$ |

At step S15-7, the verification module 55 compares the reconstructed hash digests, $h(e_N)$, with the hash digests of the corresponding purported partial key computed at step S15-3, to identify discrepancies. Based on the identified discrepancies, the verification module 55 identifies the received quorum portions that are correct and the received purported quorum portions that include errors, at step S15-9. At step S15-11, the verification module 55 derives the original secret from the reconstructed decrypted data of a quorum portion identified to be correct.

Referring to the worked example, the verification module 55 has computed hash digests $h(e_1)$, $h(e_x)$ and $h(e_4)$ and checks whether these computed values are equal to the purported hash digest values $Z_2$, $Z_3$, and $Z_5$ of reconstructed data string $D_{1,2}$, to determine if $D_{1,2}$ is correct, and concludes that $D_{1,2}$ is incorrect because none of the values would match. Similarly, the system checks whether $D_{1,4}$ is correct by comparing $h(e_1)$, $h(e_x)$ and $h(e_4)$ with the respective parts of $D_{1,4}$ and concludes that $D_{1,4}$ is correct, regardless of whether $e_x = e_2$ or not. Finally, the system checks $h(e_1)$, $h(e_x)$ and $h(e_4)$ against $Z_7$, $Z_8$, and $Z_{10}$ of $D_{2,4}$ and concludes that $D_{2,4}$ is incorrect. In this way, the validity of a received quorum portion can be verified by comparing a hash digest of the received purported partial encryption key with the reconstructed hash digest of the actual partial encryption key.

At step S15-13, the verification module 55 determines the identity or identities of participants that contributed to erroneous reconstructed data identified at step S15-9. In the worked example, the common factor is participant $I_2$ with the conclusion that he or she has presented fake or incorrect partial ciphertexts. If $h(e_x) = h(e_2)$ then the presented partial encryption key $e_x$ was correct.

As a variant, the present embodiment may be modified to shorten the length of each generated quorum portion 33. Instead of $P_1$ including $C_1(a)$, $C_1(b)$ and $C_1(c)$, $P_1$ may instead be defined to include partial ciphertext $C_1(a)$ only, and the quorum data processing module 31 can instead store defined values $R_1(b)$ and $R_1(c)$, such that $R_1(b) = C_1(b) + C_1(a)$ and $R_1(c) = C_1(c) + C_1(a)$, using mod 2 addition. Subsequently, when the verification module 55 needs to retrieve partial ciphertext $C_1(b)$, instead of deriving it directly from participant $I_1$'s received quorum portion, the partial ciphertext can be calculated from the received partial ciphertext $C_1(a)$ and the associated stored value $R_1(b)$:

$$C_1(b) = C_1(a) + R_1(b)$$

It will be appreciated that knowledge of the stored defined functions $R_1(b)$, $R_1(c)$, etc. is meaningless to a fraudster without $C_1(a)$. As a further safeguard, the stored values may be encrypted versions of $R_1(b)$, $R_1(c)$, etc. using $C_1(a)$ as the encryption key. This ensures that $R_1(b)$. $R_1(c)$, etc are only available after $C_1(a)$ has been presented by participant $I_1$ and decryption carried out using the decryption key $C_1(a)$. With this variant, the quorum portions are further reduced in size, consisting of:

$$P_1 = C_1(a), e_1$$

$$P_2 = C_2(a), e_2$$

$$P_3 = C_3(a), e_3$$

$$P_4 = C_4(a), e_4$$

As those skilled in the art will appreciate, an encryption key e may be split into parts in several ways using either overlapping or non overlapping vectors. For example a 256 bit encryption key e, could be $e_1$, consisting of 128 bits and $e_2$ consisting of another 128 bits such that $e=e_1, e_2$.

Alternatively a randomly chosen 256 bit vector R may be added modulo 2, to e to form $e_1$ and $e_2$ set equal to R. Now the encryption key $e=e_1+e_2$ and the encryption (or decryption key) is derived from the addition of the partial encryption keys which are of length 256 bits each.

Similarly ciphertexts may be subdivided into partial ciphertexts in a number of different ways.

Fifth Embodiment

A fifth embodiment of the invention will now be described using corresponding reference numerals to those of preceding figures where appropriate for corresponding elements, where the quorum system 5 of the above embodiments described above is adapted to detect and identify quorum portions, or further adapted to provide increased security, flexibility and robustness to the detection and identification process, by including an additional check or validation value for each digit position in the generated quorum portions.

In one exemplary implementation of this embodiment, weights are assigned by the quorum data processing module 15 for each participant and for each digit position, to define a unique combination of participants to recover the quorum key value at each position. For example, with a minimum of four participants from a total of six participants, it is sufficient that three participants have the correct value if these participants have weight 1 and the other participants have weight 0, for each digit position. The chosen three participants can be cycled to a different three participants for each digit position. Labelling the six participants as A, B, C, D, E and F, twenty combinations of three participants with weight 1, corresponding to twenty data values of an exemplary quorum key, can be defined as:

| ABC ABD ABE ABF ACD ACE ACF ADE ADF AEF |
| BCD BCE BCF BDE BDF BEF CDE CDF CEF DEF |

With this order, participant A is assigned the correct digit for positions 1 to 10 and incorrect digits for positions 11 to 20. Participant B is assigned the correct digit for positions 1 to 4 and 11 to 16 with incorrect digits assigned for the other positions. The other participants are assigned correct digits accordingly in similar manner. Correspondingly, for example participant A has weight 1 for digit positions 1 to 10 and weight 0 for digit positions 11 to 20.

It will be appreciated that in practice, the distributed quorum code portions 17,33 with incorrect/corrupted symbols will be at least twenty symbols long, and preferably between 30-50 symbols long for greater security, for the worked example where the predetermined minimum number of quorum participants (M) is three. In the particular exemplary case of M=4, the codes may be several hundred symbols long because there is only one error in every 20 symbols for a group of three participants. A random permutation sequence could be applied to the order in which the participants have correct digits to prevent guesswork. Additionally, measures can be implemented that discourage participants from guessing uncertain digits because two participants together know the uncertain digit positions, for example locking out participants and associated applications when the system detects that a user is inputting one or more guesses, and possibly followed by issuance of disciplinary proceedings, fines, etc.

As an alternative to assigning weights of 1 or 0 to indicate which symbols are correct or not, each symbol may be appended with a check symbol to show that it is correct or not. For example the following associations may be pseudo-randomly defined and stored as an association table by the quorum system 5, and used to determine if a received quorum portion value is correct or incorrect.

| Value | Associated value when correct | Associated value when incorrect |
|---|---|---|
| 0 | 7 | 3 |
| 1 | 2 | 9 |
| 2 | 4 | 0 |
| 3 | 6 | 7 |
| 4 | 1 | 5 |
| 5 | 8 | 2 |
| 6 | 0 | 1 |
| 7 | 9 | 4 |
| 8 | 3 | 6 |
| 9 | 5 | 8 |

For an exemplary secret sequence "6523" distributed amongst 5 participants, A, B, C, D and E, participants A, B and C may be assigned the exemplary quorum code portions:

$A = \underline{6,0} 7,4 \ 8,6 \ \underline{3,6}$ $B = 8,6 \ 3,7 \ \underline{2,4} 5,2$ $C = 1,9 \ \underline{5,8} \ 0,3 \ 4,5$ with the underlines symbol pairs identifying correct values, and the remaining symbol pairs identifying incorrect values. Participants D and E may similarly be assigned respective quorum code portions.

For a quorum of participants A, B and C, the correct values are identified so that

| A | = | 6 | — | — | 3 |
| B | = | — | — | 2 | — |
| C | = | — | 5 | — | — | where - indicates an incorrect value. Putting the correct values together from quorum participants A, B and C reveals the secret 6523.

Another advantage of the check symbol is that any attempts by participants to falsify their secret shares are readily detectable. For example, if participant A presents the quorum code portions $\underline{6,0}$ 3,4 8,6 and $\underline{3,6}$, where the underlined portions are correct, the system 5 can nevertheless determine that participant A has falsified their secret share because 3,4 is not a valid combination stored in the predefined association table.

It will be appreciated that the exemplary check symbols for this worked example are selected from a simplified set of integer values 1 to 9, to form unique symbol pairs for correct and incorrect versions of each quorum portion value. In practice, cryptographic checks can be used rather than simple check symbols in order to prevent an adversary determining the check system and subverting it. For example the check symbols may be replaced with ciphertexts resulting from encrypting the first symbol with one encryption key to indicate it is correct and another, different, encryption key to indicate the first symbol is incorrect. An alternative is to use two distinct cryptographic hash functions on the first symbol so as to indicate by means of the hash values following each symbol whether the symbol is correct or incorrect. For example, two keyed HMAC or SHA-based hash values with two secret keys can be used, one key indicating the symbol is correct and the other key indicating the symbol is incorrect. It will be apparent that practical implementations may feature sequences of symbols with symbols representing numbers, alphanumeric characters or other types of information.

Further Embodiments

In the embodiments described above, the example number of solutions or quorum portions distributed to each authorised user is predetermined with a uniform distribution. In further embodiments described below, selected authorised users of the system, for example personnel of higher rank within the secured computing environment, can be given a greater number of quorum code portions (equation solutions).

For example, in a system requiring 100 equation solutions to form a quorum, senior rank participants may be given each 50 valid numbers that satisfy 50 equations, middle rank participants may be given each 25 valid numbers that satisfy 25 equations, whilst junior rank participants may be given each only 10 valid numbers. A quorum may be reached with various combinations of participants from the different hierarchy levels, for example just two senior rank participants, or one senior rank participants plus two middle rank participants, or one senior rank participant plus one middle rank participant plus three junior rank participants, etc.

As another example, the secret key can itself be divided into predefined portions, and a respective set of quorum portions can be generated for each portion of the secret key. In this way, a distribution of quorum portions can be determined such that a minimum number of quorum participants is required from certain ones of the levels of hierarchy in order to reconstruct the original key. For example, the secret key may be split into thirds, and a set of 100 equation solutions can be generated for each portion of the secret key and distributed to participants of a corresponding rank. As another example, the secret key may be split into half, and a set of 100 equation solutions can be generated for each portion of the secret key. A third of each set of solutions can be distributed to participants of each rank. Other combinations and permutations are possible to control the minimum number of quorum participants at different levels of hierarchy, or for each hierarchy level across a plurality of areas/roles.

The following table illustrates yet another exemplary set of values defining the minimum number of quorum participants based on segregation of duties by job function and seniority:

|  | Management | IT | Compliance |
|---|---|---|---|
| Seniority | 1 of 5 | 2 of 3 | 1 of 3 |
|  | 2 of 7 | 3 of 9 | 1 of 5 |

In this scenario, the quorum portions are divided between three job functions and two levels of seniority within each job function. The quorum data processing module 31 can be configured to generate a plurality of quorum portions based on various predetermined combinations of quorum participants from this set. For example, the quorum system 5 can be configured to require one quorum consisting of users from each job function and seniority level. Therefore, at least the following participants would be required to provide respective quorum portions in order to reconstruct the secret data: one senior management, two senior IT and one senior compliance user, and two junior management, three junior IT and one junior compliance user. To achieve this required configuration, three quorum portions can be first generated from the original secret data, and each of the three quorum portions can be further processed by the quorum data processing module to generate a respective further plurality of quorum portions to be distributed between the participants within each job function, across the seniority levels.

As another example, the quorum system 5 can be configured to require one quorum from each job function, regardless of seniority level. In this example, at least the following participants would be required: one senior management or two junior management users, two senior IT or three junior IT users, and one senior or junior compliance user. To achieve this required configuration, the secret data can be first divided into three data portions, and each of the three portions can then be processed to generate a respective set of quorum portions, based on the total number of participants at each seniority level and the respective minimum number of participants required at each seniority level.

As yet a further example, the quorum system 5 can be configured to require a single quorum of participants across the three job functions, but requiring the presence of at least the senior level users within each job function. In this example, at least the following participants would be required: one senior management, two senior IT and one senior compliance user, and at least one junior management and one junior IT user to complete the quorum. To achieve this required configuration, the quorum data processing module 31 can be configured to divide the secret into six distinct portions, with two portions allocated to each job function. For each job function, a first portion of the secret can be processed by the quorum data processing module 31 to generate quorum portions for distribution to the senior level users of that job function only. Quorum portions can then be generated from the second portion for that job function, for distribution between senior and junior level users of that job function. Alternatively, the generated quorum portions 33 allocated to each job function can be divided into two non-overlapping sets, with a larger proportion of the quorum portions allocated to the set of quorum portions for distribution only to senior level users of the respective job function The following tables illustrate further exemplary sets of values for the minimum number of quorum participants that may be defined based on responsibilities of users in respective scenarios where access to sensitive data is controlled by a quorum system of the present embodiments.

| Bank transaction dispute | | |
|---|---|---|
| Bank A | Escrow Agent | Bank B |
| 1 of 5 | 1 of 3 | 1 of 5 |

In this scenario, the data to be recovered by the system may be a sensitive document such as a contract, an agreement, a high value digital asset, etc. or may be a key used to decrypt a sensitive document. The thirteen quorum data portions are generated based on the original data, for example according to the encoding process described in the third embodiment. The system may be configured to distribute a smaller number of code portions to the escrow agent than to the banks, for example to account for a respective smaller number of personnel trusted with the allocated code portions. The scenario calls for the presence of at least one participant from each bank involved in the dispute, as well as at least one participant from an independent escrow agent, to provide their respective code portions in order to recover the original data, for example according to corresponding recovery process described in the third embodiment above.

| Will writing and storage. | | |
|---|---|---|
| Executor A | Law Firm | Executor B |
| 1 of 1 | 1 of 4 | 1 of 1 |

In this scenario, the data to be recovered by the system may be legally binding will or testament, or again the key used to decrypt such a sensitive document. The six quorum data portions in this example would be generated and distributed between two trusted executors, and a small number of trusted personnel at a law firm. The scenario calls for the presence of at least one participant from the law firm, as well as at least each executor, to provide their respective code portions in order to recover the original data.

As yet a further modification to the above embodiments, the quorum system 5 can be adapted to include metadata or control data to each generated quorum portion, that can be processed by the quorum data processing module 31 on receiving a quorum portion to determine a validity status. For example, the metadata may include an expiry date and/or time for the associated quorum portion. As another example, the metadata may include a unique serial number associated with a quorum participant, for comparison with a list of serial numbers for all authorised quorum participants can be securely maintained and stored by the quorum system 5. In this way, the quorum system 5 facilitates yet further levels of access control to sensitive data by a quorum of participants, whereby the quorum system 5 can revoke access rights for a particular participant.

Computer Systems

Figure 16:
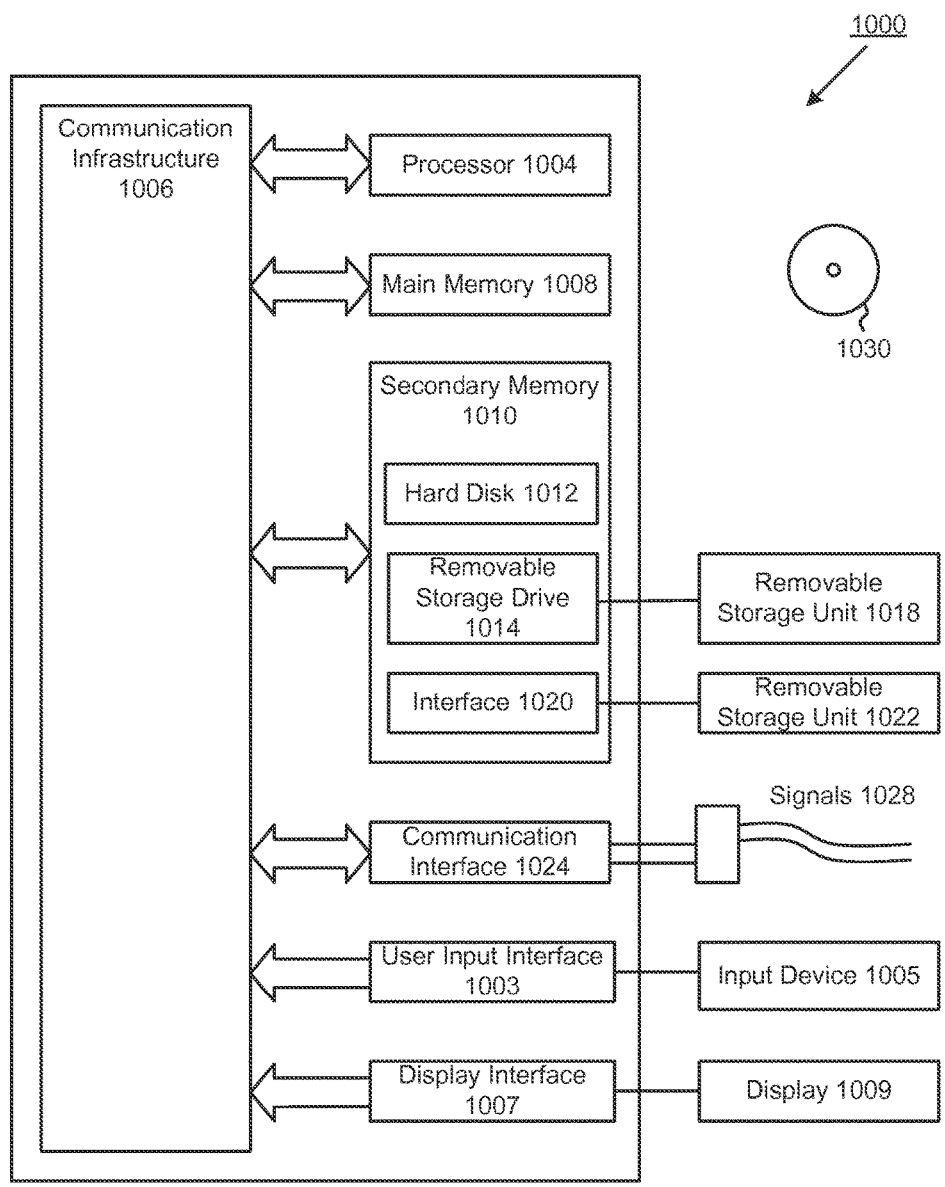
FIG. 16 is a block diagram of an example of a computer system on which one or more of the functions of the embodiments may be implemented.

The entities described herein, such as the computing devices 3 and the quorum system 5 may be implemented by computer systems such as computer system 1000 as shown in FIG. 16. Embodiments of the present invention may be implemented as programmable code for execution by such computer systems 1000. After reading this description, it will become apparent to a person skilled in the art how to implement the invention using other computer systems and/or computer architectures.

Computer system 1000 includes one or more processors, such as processor 1004. Processor 1004 may be any type of processor, including but not limited to a special purpose or a general-purpose digital signal processor. Processor 1004 is connected to a communication infrastructure 1006 (for example, a bus or network). Various software implementations are described in terms of this exemplary computer system. After reading this description, it will become apparent to a person skilled in the art how to implement the invention using other computer systems and/or computer architectures.

Computer system 1000 also includes a user input interface 1003 connected to one or more input device(s) 1005 and a display interface 1007 connected to one or more display(s) 1009. Input devices 1005 may include, for example, a pointing device such as a mouse or touchpad, a keyboard, a touchscreen such as a resistive or capacitive touchscreen, etc. After reading this description, it will become apparent to a person skilled in the art how to implement the invention using other computer systems and/or computer architectures, for example using mobile electronic devices with integrated input and display components.

Computer system 1000 also includes a main memory 1008, preferably random access memory (RAM), and may also include a secondary memory 610. Secondary memory 1010 may include, for example, a hard disk drive 1012 and/or a removable storage drive 1014, representing a floppy disk drive, a magnetic tape drive, an optical disk drive, etc. Removable storage drive 1014 reads from and/or writes to a removable storage unit 1018 in a well-known manner. Removable storage unit 1018 represents a floppy disk, magnetic tape, optical disk, etc., which is read by and written to by removable storage drive 1014. As will be appreciated, removable storage unit 1018 includes a computer usable storage medium having stored therein computer software and/or data.

In alternative implementations, secondary memory 1010 may include other similar means for allowing computer programs or other instructions to be loaded into computer system 1000. Such means may include, for example, a removable storage unit 1022 and an interface 1020. Examples of such means may include a program cartridge and cartridge interface (such as that previously found in video game devices), a removable memory chip (such as an EPROM, or PROM, or flash memory) and associated socket, and other removable storage units 1022 and interfaces 1020 which allow software and data to be transferred from removable storage unit 1022 to computer system 1000. Alternatively, the program may be executed and/or the data accessed from the removable storage unit 1022, using the processor 1004 of the computer system 1000.

Computer system 1000 may also include a communication interface 1024. Communication interface 1024 allows software and data to be transferred between computer system 1000 and external devices. Examples of communication interface 1024 may include a modem, a network interface (such as an Ethernet card), a communication port, a Personal Computer Memory Card International Association (PCMCIA) slot and card, etc. Software and data transferred via communication interface 1024 are in the form of signals 1028, which may be electronic, electromagnetic, optical, or other signals capable of being received by communication interface 1024. These signals 1028 are provided to communication interface 1024 via a communication path 1026. Communication path 1026 carries signals 1028 and may be implemented using wire or cable, fibre optics, a phone line, a wireless link, a cellular phone link, a radio frequency link, or any other suitable communication channel. For instance, communication path 1026 may be implemented using a combination of channels.

The terms "computer program medium" and "computer usable medium" are used generally to refer to media such as removable storage drive 1014, a hard disk installed in hard disk drive 1012, and signals 1028. These computer program products are means for providing software to computer system 1000. However, these terms may also include signals (such as electrical, optical or electromagnetic signals) that embody the computer program disclosed herein.

Computer programs (also called computer control logic) are stored in main memory 1008 and/or secondary memory 1010. Computer programs may also be received via communication interface 1024. Such computer programs, when executed, enable computer system 1000 to implement embodiments of the present invention as discussed herein.

Accordingly, such computer programs represent controllers of computer system 1000. Where the embodiment is implemented using software, the software may be stored in a computer program product 1030 and loaded into computer system 1000 using removable storage drive 1014, hard disk drive 1012, or communication interface 1024, to provide some examples.

Alternative embodiments may be implemented as control logic in hardware, firmware, or software or any combination thereof.

ALTERNATIVES AND MODIFICATIONS

It will be understood that embodiments of the present invention are described herein by way of example only, and that various changes and modifications may be made without departing from the scope of the invention.

In particular, aspects of the present embodiments can be combined to form further embodiments, for example to vary the quorum portion check strength on a portion by portion basis, based on confidence of each particular quorum participant or risk of corruptive values in the associated quorum portions. For example, the system can be adapted to provide for a greater level of security by varying the cryptographic functions that are used to generate checks for particular participants.

As another example, as a modification to the second embodiment described above, false values may be given to the participants with the quorum code portions located in secret sequence positions, known only by the system. For example for the worked example discussed above with reference to FIG. 9, the participants could be given the GF(37) sequences where the quorum code elements are notionally identified in parentheses:

Participant 1: (9 4) 1 15 2 19 36
Participant 2: 22 11 28 (13 9) 35
Participant 3: 28 21 17 7 30 (9 24)
Participant 4: 13 (36 9) 27 5 17
Participant 5: 17 4 (18 19) 23 7 31
Participant 6: (34 7) 9 11 18 26 8

As another alternative, the quorum keys and code portions can be themselves encrypted, using any suitable encryption system, with a common or distinct key known only to the intended participant, to prevent any third parties (including other participants) learning the quorum keys. Further alternatively, the system may store the decryption keys securely so that the participants are never able to learn of the equation solutions that they possess. Additionally or further alternatively, the information sub-divided amongst participants may contain corrupted characters in unknown or random positions and the constructed equations may be used by the quorum of participants to correct the corrupted characters. In cases where the participants have deliberately corrupted their given information, the constructed equations may be used by the quorum of participants not only to correct the corrupted characters, but also to identify the participants presenting false information.

In the second embodiment described above, the mapping table is based on elements of a Galois Field Alternatively or additionally, other known forms of mapping can be used. For example, field elements need not be constructed using discrete arithmetic. Complex numbers are field elements and a codeword of length N may be constructed by setting $\alpha = e^{j2\pi/N}$ where i is the imaginary operator. In this case passwords or keys may be specified using sequences of decimal numbers, eg 5.12347889 1.9875443 1.6492228, etc. Codewords consist of N complex numbers satisfying a set of defined equations. The same procedure as described above is followed to derive the equations. The first $P_{0\ k}$ sequence is $\alpha^0$ for all k=0 to N−1 that is all 1's. The intermediate sequences $Q_{j\ k}$ are constructed as $Q_{j\ k} = \alpha^k - \alpha^x$ for all k=0 to N−1 and x is a constant integer with a value chosen from 0 to N−1 depending on which position of the codeword is being solved. Preferably, the arithmetic and formatting of numbers is implemented with sufficient precision so that no significant decimal places are lost in solving the equations to reconstruct the password or key.

In the second embodiment described above, the quorum code comprises a sequence of elements or values including the representative values of the secret key, followed by a sequence of numerical solutions that are computed from a corresponding set of twelve equations. As those skilled in the art will appreciate, as a further alternative embodiment, the quorum code can include additional elements or values that are also provided as inputs to the equations for solving unknown values in the quorum code, as discussed above. These additional elements or values can represent or be associated with further information for verifying or authenticating a particular individual or entity, and may be received or retrieved from various data sources. For example, the additional elements or values may be current Global Positioning System (GPS) coordinates of a user's computing device, automatically determined and retrieved from a GPS module of the device. It is appreciated that the GPS coordinates may be included as complex number elements of the quorum code, or as sub-sequences of integer values added at a predetermined position in the quorum code. Part of a quorum participant's quorum code portion that is used as input to reconstruct the original key may be data associated with the participant's current physical location, as described by GPS coordinates retrieved from the associated computing device (or from a connected GPS module). The quorum participants have to be at, or within, a predefined geographical location, or at the same location as the other participants, in order for the original data to be reconstructed. Additionally or further alternatively, the additional values may be time or date stamps so that quorum participants have to input their data at predefined times or dates in order for the original data to be reconstructed. Additionally or further alternatively, the additional values may be identification data associated with the computing device, such as a mobile phone number, identification number, network address, serial number, etc. The reconstruction process would therefore include automatic retrieval of the identification data from the computing device as additional inputs to solve for the unknown values of the reconstructed key, where reconstruction of the original key is only possible if the quorum code portions are received from an authorised device. In this way, a further level of identity verification and authentication is thereby integrated into the quorum-based data process of the present embodiment.

In the embodiments described above, the quorum key or code portions are transmitted to and stored by computing devices of respective authorised users of the system. As those skilled in the art will appreciate, as an alternative, the quorum key or code portions may instead be provided in the form of an authentication token or absolute or derived biometric properties of participant(s). For example, the quorum key or code portions may be encoded and stored in a magnetic strip of a physical card, or may be encoded as a bar- or QR-code that is printed on a physical or displayed on a virtual card, or may be encoded and stored in a RFID tag. As another example, the quorum key or code portions may be stored in a hardware dongle with a wireless data communication interface for communicating the quorum data to the quorum verification device via a corresponding communication interface. As yet another example, the quorum verification device may be configured with an interface for receiving user input of the respective quorum key or code portions, and to output the reconstructed data temporarily on a display, or to communicate the reconstructed data to a further data processing device for example to complete decryption of data using the reconstructed secret key, or to a device controlling access to a secured asset, such as an electronic lock that is unlocked in response to receiving the correct reconstructed passcode. In such an example, the quorum verification device may be incorporated as a processing module or element of the further data processing device or access controlling device. Additionally, the quorum key or code portions may be electronically communicated to the respective authorised users, for example by email or text message.

As another alternative, rather than sub-dividing the quorum code information amongst authorised users of the system, for example as described in the second embodiment, the solutions to the equations may be distributed amongst a plurality of computing device(s), authentication token(s) and/or security dongle(s) associated with one particular user, for improved multi-factor authentication based on a quorum of code portions received from the predefined minimum number of user authentication devices.

In the embodiments described above, secret data is encoded by the quorum data processing module into quorum portions for distribution to authorized participants, where the secret data may be a secret key or a secure data file. It will be appreciated that the quorum data generation and verification techniques are applicable to any form of data file or blocks of data making up a data stream to be communicated over a data network. For example, the quorum data processing module may be configured to repeat the quorum data generation process for portions of a data file or block of data of a predefined size, whereby the original data portions are reconstructed by the system upon receiving the required minimum number of quorum portions, and recombined to recover the original data file or block of data.

Yet further alternative embodiments may be envisaged, which nevertheless fall within the scope of the following claims. The term "includes", as employed in the detailed description or the claims, is intended to be inclusive in a manner similar to the term "comprising" as that term is interpreted when employed as a transitional word in a claim.

The invention claimed is:

1. A computer-implemented method of quorum-based data recovery, by a quorum system in communication with a plurality of computing devices via a data network, the computing devices associated with respective users that are entities authorized to participate as quorum members, the method comprising:

receiving, from the plurality of computing devices by the quorum system, at least a predetermined minimum number of quorum portions generated from original data using a secret key that is partitioned into a plurality of key components, wherein each received quorum portion comprises:
at least one ciphertext portion defining a received set of ciphertext portions generated by encrypting the original data using a partial encryption key formed from a corresponding defined combination of said key components; and
at least one received key component of said plurality of key components, wherein the at least one received key component was not included in the defined combination of key components of the partial key used to generate the set of ciphertext portions of the corresponding received quorum portion;

identifying the plurality of received key components from the received quorum portions;

determining a plurality of candidate combinations of the identified received key components, each candidate combination forming a candidate partial key, and wherein each candidate combination corresponds to a defined set of ciphertext portions;

identifying and decrypting, for the defined set of ciphertext portions of each candidate partial key, the corresponding at least one ciphertext portion from the received quorum portions, using the respective candidate partial key; and determining that at least one candidate partial key is a legitimate partial key to recover the original data by verifying received quorum portions that are correct and received purported quorum portions that include errors from the corresponding decrypted at least one ciphertext portion.

2. The method of claim 1, wherein each ciphertext portion is generated by encrypting data comprising the original data and a hash of each key component of the corresponding partial key.

3. The method of claim 2, wherein the received ciphertext portions are decrypted to recover the original data and hash of said partial encryption keys, and at least one received quorum portion is identified as containing incorrect data based on a discrepancy between the recovered hash of the respective partial encryption key and a computed hash of the received respective partial encryption key.

4. The method of claim 1, wherein the corresponding at least one received ciphertext portions are identified using stored masking data defining the combinations of key components of the partial keys.

5. The method of claim 1, further comprising calculating at least one modifier value derived from said decrypted at least one ciphertext portion, and reconstructing at least one other ciphertext portion using the calculated at least one modifier value.

6. The method of claim 3, further comprising receiving a greater number of quorum portions than said predetermined minimum number, wherein the original data is recovered from a combination of received quorum portions that produces no discrepancies in any of the hash values of the partial encryption keys of said combination of received quorum portions.

7. The method of claim 1, wherein each quorum portion includes encoded control data indicating that the associated quorum portion contains correct or incorrect data values.

8. The method of claim 7, wherein each quorum portion is generated from data including said control data at respective defined positions in the original data, wherein corrupted data values are identified from discrepancies with the control data in the reconstructed original data.

9. The method of claim 8, wherein the control data is generated based on a cryptographic function of the data value of the associated quorum portion, wherein corrupted data values are identified from discrepancies between the reconstructed control data and recomputed control data values based on the cryptographic function of data values from the reconstructed original data.

10. The method of claim 1, wherein the original data comprises a portion of a data file or data stream, and wherein the data recovery process is repeated for each of a plurality of portions of the data file or data stream.

11. The method of claim 1, further comprising generating said plurality of quorum portions from original data, and distributing the plurality of quorum portions between a plurality of entities.

12. The method of claim 11, wherein the entities comprise one or more of: a computing device, an authentication token and a security dongle.

13. The method of claim 11, wherein identified discrepancies in received quorum portions are used to identify the associated entity presenting quorum portions containing corrupted or erroneous values.

14. The method of claim 11, wherein one or more of said entities receives a greater proportion of said quorum portions.

15. The method of claim 1, wherein each quorum portion is received from a corresponding computing device, together with additional data associated with the computing device, and wherein the defined series of reconstruction relationships encode dependencies between data values of the received versions and the additional data.

16. The method of claim 15, wherein the additional data is associated with a current location and/or current time and/or current date and/or identity of the computing device.

17. The method of claim 1, wherein the original data is an encryption or decryption key, an authentication key or a password.

18. The method of claim 1, wherein at least one quorum portion includes metadata associated with validity of the quorum portion.

19. The method of claim 1, wherein the verifying is based on a comparison of a reconstructed hash of each partial key in the candidate combination to a computed hash of the corresponding received partial key.

20. The method of claim 1, wherein said subset consists of one of the defined combination of partial encryption keys used to generate the ciphertext portions.

21. The method of claim 1, wherein the verifying comprises determining the identity or identities of one or more quorum members that contributed to erroneous reconstructed data.

22. A quorum system comprising one or more processors in communication with a plurality of computing devices, each computing device associated with respective users that are entities authorized to participate as quorum members for quorum-based data recovery, the system configured to:
receive, from the plurality of computing devices, at least a predetermined minimum number of quorum portions generated from original data using a secret key that is partitioned into a plurality of key components, wherein each received quorum portion comprises:
at least one ciphertext portion defining a received set of ciphertext portions generated by encrypting the original data using a partial key formed from a corresponding defined combination of said key components; and
at least one received key component of said plurality of key components, wherein the at least one received key component was not included in the defined combination of key components of the partial key used to generate the set of ciphertext portions of the corresponding received quorum portion;
determine a plurality of candidate combinations of the identified received key components, each candidate combination forming a candidate partial key, and wherein each candidate combination corresponds to a defined set of ciphertext portions;
identify and decrypt, for the defined set of ciphertext portions of each candidate partial key, the corresponding at least one received ciphertext portion from the received quorum portions, using the respective candidate partial key; and
determine that at least one candidate partial key is a legitimate partial key to recover the original data by verifying received quorum portions that are correct and received quorum portions that include errors from the corresponding decrypted at least one ciphertext portion.

23. A non-transitory computer-readable medium comprising computer-executable instructions that, when executed, perform a method of quorum-based data recovery, by a quorum system in communication with a plurality of computing devices via a data network, the computing devices associated with respective users that are entities authorized to participate as quorum members, comprising:
receiving, from the plurality of computing devices by the quorum system, at least a predetermined minimum number of quorum portions generated from original data using a secret key that is partitioned into a plurality of key components, wherein each received quorum portion comprises:
at least one ciphertext portion defining a received set of ciphertext portions generated by encrypting the original data using a partial encryption key formed from a corresponding defined combination of said key components; and
at least one received key component of said plurality of key components, wherein the at least one received key component was not included in the defined combination of key components of the partial key used to generate the set of ciphertext portions of the corresponding received quorum portion;
identifying the plurality of received key components from the received quorum portions;
determining a plurality of candidate combinations of the identified received key components, each candidate combination forming a candidate partial key, and wherein each candidate combination corresponds to a defined set of ciphertext portions;
identifying and decrypting, for the defined set of ciphertext portions of each candidate partial key, the corresponding at least one ciphertext portion from the received quorum portions, using the respective candidate partial key; and
determining that at least one candidate partial key is a legitimate partial key to recover the original data by verifying received quorum portions that are correct and received purported quorum portions that include errors from the corresponding decrypted at least one ciphertext portion.

* * * * *